United States Patent
Kojima et al.

(10) Patent No.: US 8,180,539 B2
(45) Date of Patent: May 15, 2012

(54) LOCATION RANGE SETTING APPARATUS, CONTROL METHOD AND CONTROLLER FOR APPARATUS MOUNTED IN MOBILE OBJECT, AND AUTOMOTIVE AIR CONDITIONER AND CONTROL METHOD FOR THE SAME

(75) Inventors: Yasufumi Kojima, Gifu (JP); Hiroshi Takeda, Nagoya (JP); Kosuke Hara, Hachioji (JP)

(73) Assignee: Denso Corporation, Kariya (JP)

(*) Notice: Subject to any disclaimer, the term of this patent is extended or adjusted under 35 U.S.C. 154(b) by 734 days.

(21) Appl. No.: 12/315,276

(22) Filed: Dec. 2, 2008

(65) Prior Publication Data
US 2009/0150024 A1  Jun. 11, 2009

(30) Foreign Application Priority Data
Dec. 6, 2007  (JP) .................. 2007-316079

(51) Int. Cl.
*G06F 7/00* (2006.01)
(52) U.S. Cl. ........................................ 701/59
(58) Field of Classification Search .............. 701/25, 701/27, 36, 59, 207, 209, 408, 412; 700/28–32, 700/47–50
See application file for complete search history.

(56) References Cited

U.S. PATENT DOCUMENTS

| | | | |
|---|---|---|---|
| 5,427,313 A * | 6/1995 | Davis et al. ................. | 236/49.3 |
| 6,435,417 B1 * | 8/2002 | Holdgrewe et al. ......... | 236/46 R |
| 6,498,958 B1 | 12/2002 | Tateishi et al. | |
| 2004/0102151 A1 | 5/2004 | Shikata et al. | |
| 2006/0195483 A1 | 8/2006 | Heider et al. | |
| 2007/0288413 A1 | 12/2007 | Mizuno et al. | |

FOREIGN PATENT DOCUMENTS

| | | |
|---|---|---|
| CN | 1389675 | 1/2003 |
| CN | 1504354 | 6/2004 |
| DE | 44 26 732 | 2/1995 |
| DE | 698 12 525 | 4/1999 |
| DE | 698 11 814 | 8/1999 |
| DE | 100 03 548 | 8/2000 |
| DE | 199 04 143 | 8/2000 |
| DE | 102 02 928 | 7/2003 |
| DE | 103 33 181 | 5/2005 |

(Continued)

OTHER PUBLICATIONS

Richard O. Duda et al., "Pattern Classification", Second Edition, John Wiley & Sons, Inc. 2001.

(Continued)

*Primary Examiner* — Kim T Nguyen
(74) *Attorney, Agent, or Firm* — Harness, Dickey & Pierce, PLC

(57) ABSTRACT

A location range setting apparatus includes: a location information acquiring unit for acquiring location information indicating the location of a mobile object; a road information acquiring unit for acquiring road segment information indicating a specific segment of a road; a segment determining unit for associating the location information with corresponding road segment information; a storage unit for storing a plurality of pieces of location information and road segment information respectively as learned data; a clustering unit for clustering the plurality of pieces of road segment information included in the learned data into at least a first cluster or a second cluster; and a location range setting unit for determining first and second ranges for the location of the mobile object from the road segment information included in the first and second clusters, respectively.

15 Claims, 13 Drawing Sheets

FOREIGN PATENT DOCUMENTS

| | | |
|---|---|---|
| DE | 103 50 715 | 6/2005 |
| JP | 08-271026 | 10/1996 |
| JP | 11-147415 | 6/1999 |
| JP | 2000-062431 | 2/2000 |
| JP | 2000-293204 | 10/2000 |
| JP | 2002-507793 | 3/2002 |
| JP | 2002-357443 | 12/2002 |
| JP | 2003-220816 | 8/2003 |
| JP | 2005-165388 | 6/2005 |
| JP | 2005-257270 | 9/2005 |
| JP | 2003-080927 | 3/2006 |
| JP | 2006-113457 | 4/2006 |
| JP | 2006-157990 | 6/2006 |
| JP | 2006-185189 | 7/2006 |
| JP | 2006-240387 | 9/2006 |
| JP | 2007-156894 | 6/2007 |
| WO | WO2005/047062 | 5/2005 |
| WO | WO 2005/091214 | 9/2005 |

OTHER PUBLICATIONS

Y. Motomura and H. Iwasaki, "Technology of Bayesian Networks", Tokyo Denki University Press, Jul. 2006.

K. Shigemasu et al., "Overview of Bayesian Networks", Baifukan, Jul. 2006.

Office Action dated Nov. 22, 2010, for corresponding German Application No. 10 2008 007 725.9, and English translation thereof.

Office action dated Jul. 30, 2010 in corresponding Chinese Application No. 200810184608.9.

Office action dated Dec. 2, 2008 in Japanese Application No. 2007/032251.

Office action dated Sep. 25, 2009 in related Chinese Application No. 2008 10131658.0.

Office action dated Sep. 21, 2010 in related German Application No. 070452316 and English translation.

Adams, Douglas,"Per Anhalter durch die Galaxis", novel, $14^{th}$ edn., reprint of UB31070, Frankfurt am Main; Berlin, Ullstein, 1990, chapter 10, pp. 83-84. ISBN 3-548-22491-1 (English translation of the relevant part).

Office action dated Mar. 29, 2011 in related Japanese Application No. 2006-260699.

Office Action dated Sep. 22, 2011 (mail date Sep. 27, 2011) regarding corresponding Japanese Patent Application No. 2007-098522 with English translation thereof.

Office Action dated Aug. 10, 2011 (mail date Aug. 16, 2011) regarding corresponding Japanese Patent Application No. 2007-316079 with English translation thereof.

* cited by examiner

| $(x_1, x_2, x_3)$ | $P(x_4 | x_1, x_2, x_3)$ |
|---|---|
| (0,0,0) | 0.1 |
| (1,0,0) | 0.2 |
| (0,1,0) | 0.4 |
| (0,0,1) | 0.3 |
| (1,1,0) | 0.55 |
| (1,0,1) | 0.15 |
| (0,1,1) | 0.7 |
| (1,1,1) | 0.95 |

| DAY OF WEEK: $x_1$ | $P(x_1)$ |
|---|---|
| SATURDAY ($x_1=1$) | 0.143 |
| OTHER THAN SATURDAY ($x_1=0$) | 0.857 |

| TIME SEGMENT: $x_2$ | $P(x_2)$ |
|---|---|
| DAYTIME ($x_2=1$) | 0.5 |
| NIGHTTIME ($x_2=0$) | 0.5 |

| CURRENT LOCATION: $x_3$ | $P(x_3)$ |
|---|---|
| PARK ($x_3=1$) | 0.15 |
| OTHER THAN PARK ($x_3=0$) | 0.85 |

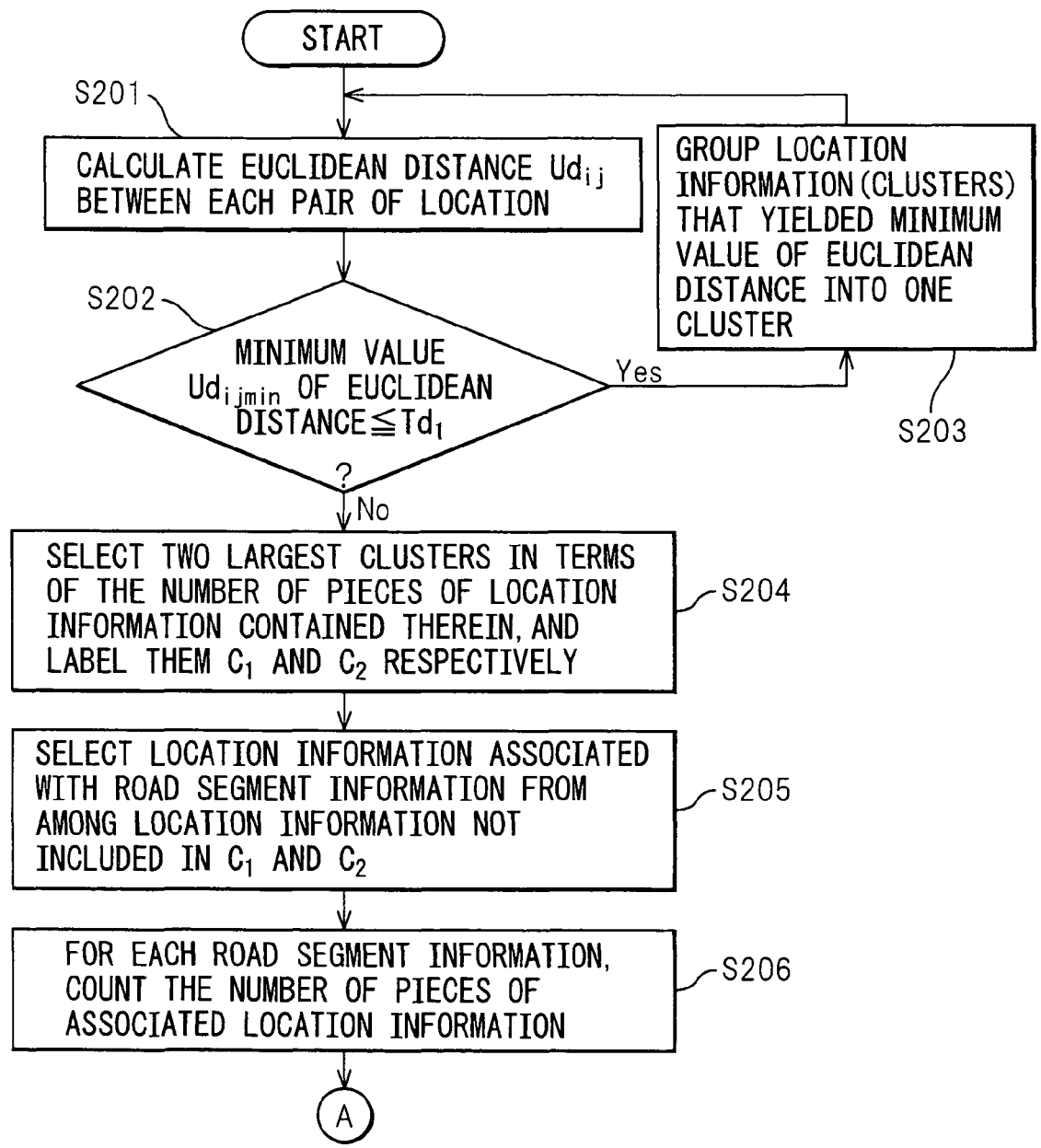

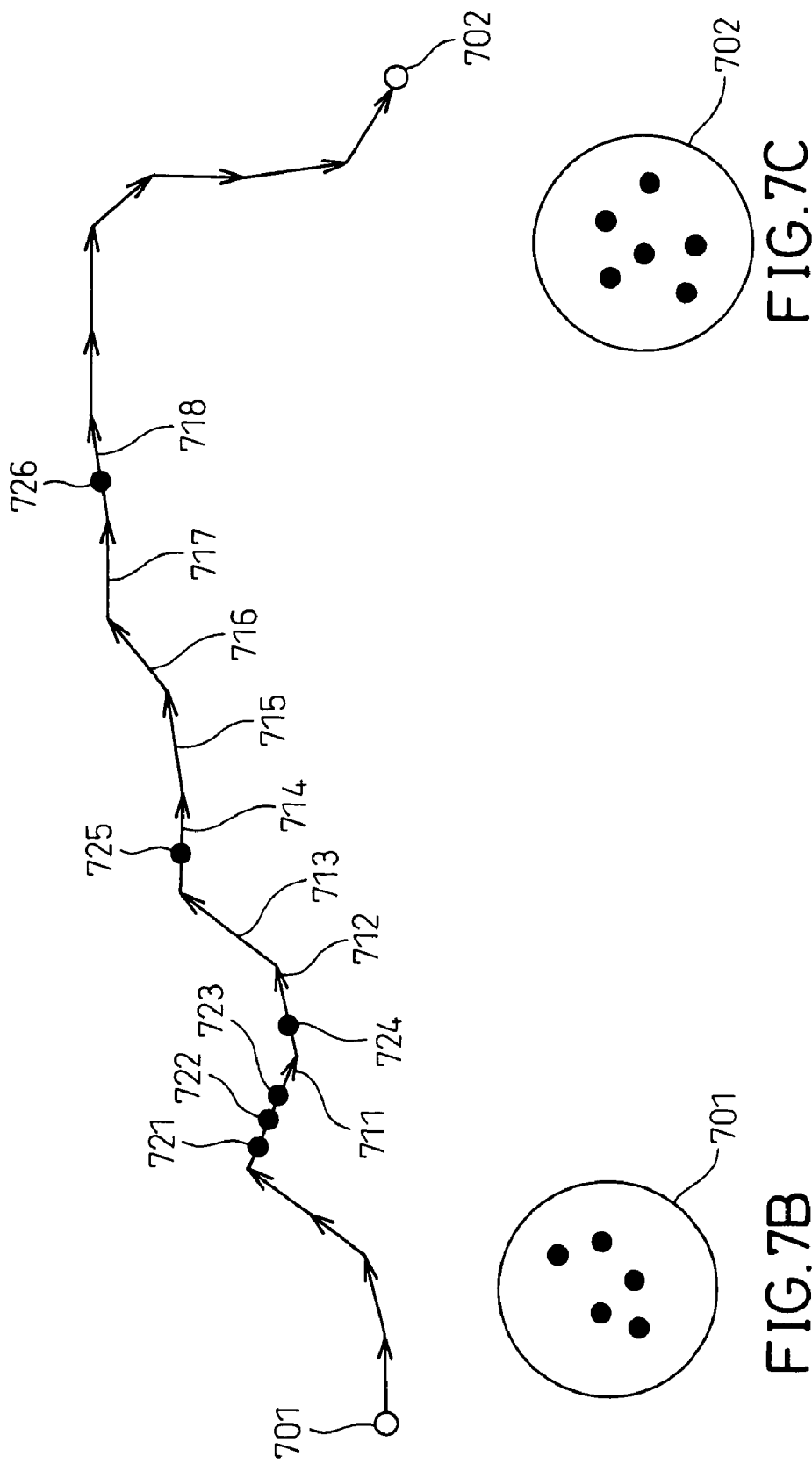

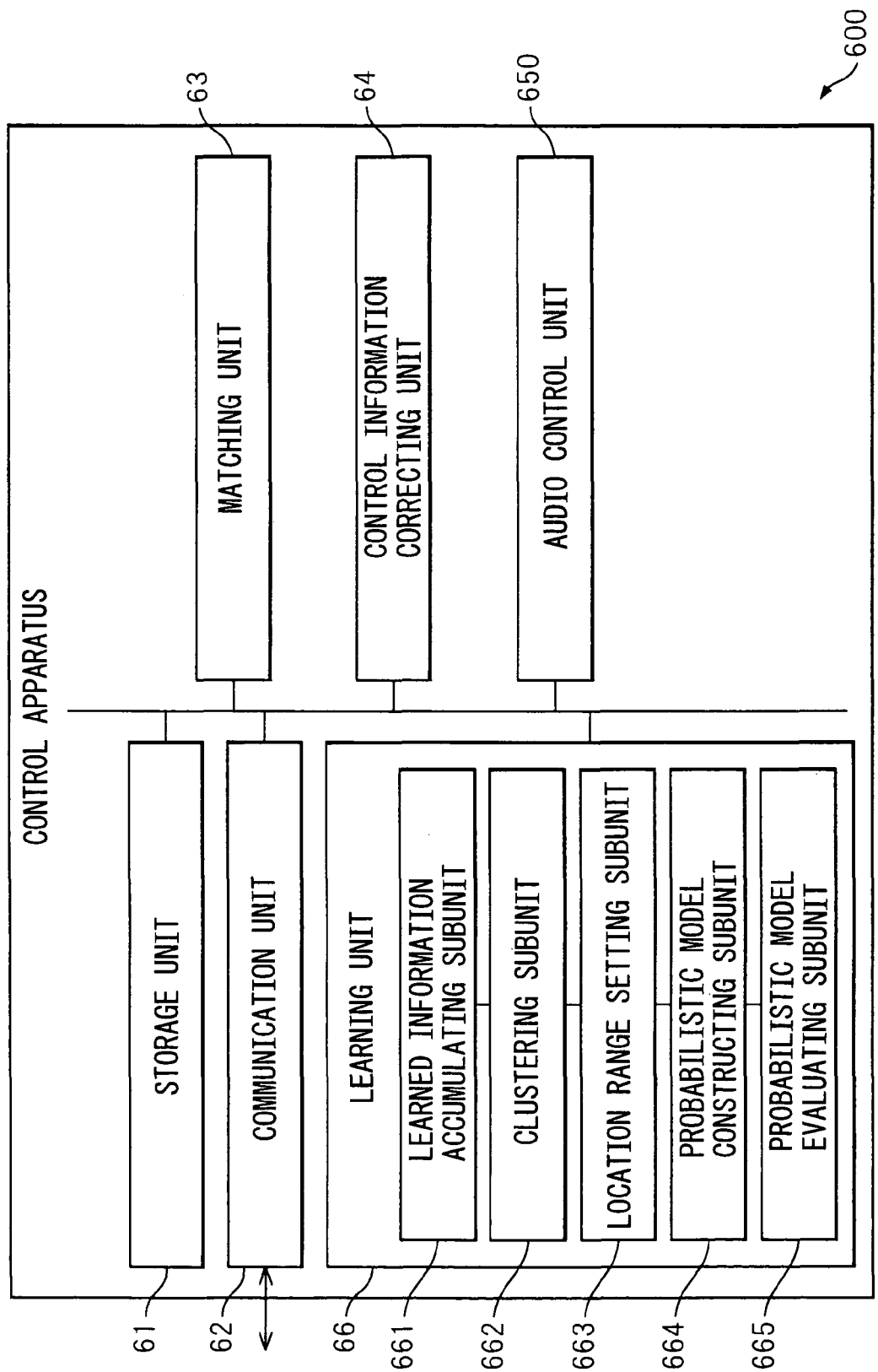

LOCATION RANGE SETTING APPARATUS, CONTROL METHOD AND CONTROLLER FOR APPARATUS MOUNTED IN MOBILE OBJECT, AND AUTOMOTIVE AIR CONDITIONER AND CONTROL METHOD FOR THE SAME

CROSS-REFERENCE TO RELATED APPLICATION

The Applicant claims the right to priority based on Japanese Patent Application JP 2007-316079, filed on Dec. 6, 2007, and the entire content of JP 2007-316079 is hereby incorporated by reference.

FIELD OF THE INVENTION

The present invention relates to a location range setting apparatus, a control method and a controller for an apparatus mounted in a mobile object, and an automotive air conditioner and a control method for the same, and more particularly to a control method and a controller for an apparatus mounted in a mobile object that automatically optimize the setting of the apparatus mounted in the mobile object in accordance with the location of the mobile object, and an automotive air conditioner and a control method for the same that optimize air conditioning state inside a vehicle in accordance with the location of the vehicle.

BACKGROUND OF THE INVENTION

Generally, an automotive air conditioner automatically determines the temperature, airflow level, etc., of conditioned air discharged from selected air outlets by reference to various parameters such as temperature setting, outside temperature, inside temperature, and solar radiation. However, human sensitivity to temperature differs from one person to another (some are sensitive to heat, while others are sensitive to cold). As a result, the automatically determined temperature, airflow level, etc., of the conditioned air may not be optimum for every occupant. In that case, an occupant may adjust the air conditioner to raise or lower the temperature setting or to increase or reduce the airflow level by operating an operation panel. In view of this, Japanese Unexamined Patent Publication No. 2000-293204 discloses an air conditioner in which a learning control is incorporated that corrects a relational equation for determining the temperature or airflow level of conditioned air, by using relevant parameters when an occupant has changed the setting such as the temperature setting or airflow level by operating an operation panel.

However, a vehicle occupant does not always change the setting of the air conditioner because his or her sensitivity to temperature differs from others. The occupant may, for example, change the setting due to external environmental factors in a specific situation. For example, if the occupant has just exercised before driving the vehicle, the occupant may want to set the temperature lower than normal. Further, when the vehicle approaches a place where traffic congestion always occurs, the occupant may set the air inlet mode of the air conditioner to an inside air recirculation mode in order to prevent exhaust gas from flowing into the inside of the vehicle. However, the air conditioner disclosed in Japanese Unexamined Patent Publication No. 2000-293204 cannot distinguish whether the occupant has changed the setting of the air conditioner because of external environmental factors in a specific situation or because the set value automatically adjusted by the air conditioner did not match the occupant's sensitivity to temperature. As a result, with the above-disclosed air conditioner, it has been difficult to automatically optimize the air conditioning temperature, etc. to suit specific situations such as described above.

On the other hand, Japanese Unexamined Patent Publication No. 2000-62431 discloses an automotive climate control system that makes it possible to discriminate between temperature control learning and other learning by adding data indicating the current location of a vehicle to the learned data. This automotive climate control system determines whether the temperature control learning is to be performed or not, by referring to the date and time and the location of the vehicle. However, Japanese Unexamined Patent Publication No. 2000-62431 does not disclose optimizing the air conditioning temperature, etc., to suit specific situations such as described above.

If the air conditioning temperature, etc., are to be optimized to suit specific situations, each specific situation must be accurately identified. Accordingly, in the case of the automotive climate control system disclosed in Japanese Unexamined Patent Publication No. 2000-62431, for example, it becomes necessary to determine the range of the date and time and the range of the location of the vehicle where the temperature control learning is to be performed. However, it has been difficult to set such ranges in advance because the range of the date and time and the range of the location of the vehicle vary depending on the vehicle driver. In particular, if it is intended that the air conditioner setting be optimized in accordance with a specific segment of a road, the problem is that the length of such a specific segment may extend several kilometers. A similar problem can occur when automatically controlling other vehicle-mounted apparatus than the air conditioner in accordance with a specific situation. There is therefore a need to provide a method for determining a location range that corresponds to such a specific situation.

SUMMARY OF THE INVENTION

It is an object of the present invention to provide a location range setting apparatus that can accurately determine the location range of a mobile object that corresponds to a specific situation, and also to provide a control method and a controller for an apparatus mounted in the mobile object, and an automotive air conditioner and a control method for the same.

It is another object of the present invention to provide a control method, a controller for an apparatus mounted in a mobile object, an automotive air conditioner and a control method for the same that can automatically learn an optimum setting that matches a specific situation.

According to one aspect of the present invention, there is provided a location range setting apparatus. The location range setting apparatus includes: a location information acquiring unit for acquiring location information indicating a location of a mobile object; a road information acquiring unit for acquiring road segment information indicating a specific segment of a road; a segment determining unit for associating the location information with the road segment information corresponding to the location indicated by the location information; a storage unit for storing a plurality of pieces of location information and road segment information respectively as learned data; a clustering unit for clustering the plurality of pieces of road segment information, with which the location information is associated, into at least a first cluster or a second cluster; and a location range setting unit for determining a first range for the location of the mobile object from the road segment information included in the first cluster, and for determining a second range for the location of the mobile object from the road segment information included in the second cluster.

Since the location range setting apparatus according to the present invention determines the location range of the mobile object by performing clustering based on the road segment information, it can be checked whether the acquired mobile object location matches a specific segment on the road. When the acquired mobile object location matches a specific segment on the road, the location range setting apparatus can accurately differentiate that specific segment from other regions.

According to another aspect of the present invention, there is provided a controller for an apparatus mounted in a mobile object. The controller includes: a location information acquiring unit for acquiring location information indicating a location of the mobile object; a road information acquiring unit for acquiring road segment information indicating a specific segment of a road; a segment determining unit for associating the location information with the road segment information corresponding to the location indicated by the location information; a storage unit for storing a plurality of pieces of location information and road segment information respectively as learned data; a learning unit for constructing, by using the learned data, a probabilistic model into which the location information is inputted in order to calculate a recommended probability of a specific setting operation; a control information correcting unit for calculating the recommended probability by inputting current location information, which indicates the current location of the mobile object, into the probabilistic model constructed by the learning unit, and for correcting setting information or control information related to a user setting operation in accordance with the recommended probability so as to achieve the specific setting operation; and a control unit for controlling the apparatus in accordance with the corrected setting information or control information. The learning unit includes: a clustering subunit for clustering the plurality of pieces of road segment information included in the learned data into at least a first cluster or a second cluster; a location range setting subunit for determining a first range for the location of the mobile object from the road segment information included in the first cluster, and for determining a second range for the location of the mobile object from the road segment information included in the second cluster; and a probabilistic model constructing subunit for constructing the probabilistic model by determining the recommended probability for the mobile object location contained in the first range and the recommended probability for the mobile object location contained in the second range.

Since the controller according to the present invention optimally determines the location range of the mobile object that corresponds to a specific situation, and constructs, based on the result, the probabilistic model for calculating the probability, when the mobile object arrives at a location corresponding to the specific situation, the apparatus mounted in the mobile object can be automatically controlled to match the specific situation. In particular, since the controller determines the location range of the mobile object by performing clustering based on the road segment information, even when a specific situation that requires adjusting the apparatus mounted in the mobile object occurs on a specific segment of a road, the controller can control the apparatus mounted in the mobile object by differentiating that specific segment from other regions.

According to still another aspect of the present invention, there is provided an automotive air conditioner. The automotive air conditioner includes: an air-conditioning unit for supplying conditioned air into a vehicle; a location information acquiring unit for acquiring location information indicating a location of the vehicle; a road information acquiring unit for acquiring road segment information indicating a specific segment of a road; a segment determining unit for associating the location information with the road segment information corresponding to the location indicated by the location information; a storage unit for storing a plurality of pieces of location information and road segment information respectively as learned data; a learning unit for constructing, by using the learned data, a probabilistic model into which the location information is inputted in order to calculate a recommended probability of a vehicle occupant performing a specific setting operation; a control information correcting unit for calculating the recommended probability by inputting current location information, which indicates the current location of the vehicle, into the probabilistic model constructed by the learning unit, and for correcting setting information or control information related to the setting operation of the occupant in accordance with the recommended probability so as to achieve the specific setting operation; and an air-conditioning control unit for controlling the air-conditioning unit in accordance with the corrected setting information or control information. The learning unit includes: a clustering subunit for clustering the plurality of pieces of road segment information included in the learned data into at least a first cluster or a second cluster; a location range setting subunit for determining a first range for the location of the vehicle from the road segment information included in the first cluster, and for determining a second range for the location of the vehicle from the road segment information included in the second cluster; and a probabilistic model constructing subunit for constructing the probabilistic model by determining the recommended probability for the vehicle location contained in the first range and the recommended probability for the vehicle location contained in the second range.

Since the air conditioner according to the present invention optimally determines the location range of the vehicle that corresponds to a specific situation, and constructs, based on the result, the probabilistic model for calculating the probability, when the vehicle arrives at a location corresponding to the specific situation, the air conditioner setting can be automatically optimized for the specific situation. In particular, since the air conditioner determines the location range of the vehicle by performing clustering based on the road segment information, even when a specific situation that requires adjusting the air conditioner setting occurs on a specific segment of a road, the air conditioner can optimize the air conditioner setting for that specific segment by differentiating it from the air conditioner setting for other regions.

Here, the specific setting operation refers to, for example, the operation for changing the operation state of the air conditioner, such as changing the temperature setting or airflow level setting, setting the air conditioner to the inside air recirculation mode, or activating or deactivating the defroster. The setting information refers to, for example, the information for regulating the operation of the automotive air conditioner, such as temperature setting, airflow level, inside/outside air intake ratio, airflow ratio of conditioned air between various air outlets, etc. Further, the control information refers to, for example, the information that is determined based on the setting information and used to control the operation of the various parts of the air-conditioning unit, such as the temperature of the conditioned air, the number of revolutions of the blower fan, and the opening of the air mix door.

Preferably, in the above apparatus, controller, or air conditioner, the location range setting unit (subunit) indicates the first range by identification information identifying the road segment information included in the first cluster.

In this way, when the first range is indicated by the identification information identifying the road segment information, only the specific segment on the road can be easily differentiated from other regions. Accordingly, if the specific segment has a length extending several kilometers, or if it is not a straight segment, the first range can be easily differentiated from other regions. Furthermore, even in a segment in which there are a plurality of roads, for example, an expressway and an ordinary road, running in parallel to each other, it is possible to differentiate one from the other.

Preferably, in the above apparatus, controller, or air conditioner, the clustering unit (subunit) clusters, from among the plurality of pieces of location information included in the learned data, the location information whose distance relative to each other is not greater than a predetermined value into at least one third cluster, and clusters the road segment information with which the location information not included in the at least one third cluster is associated into the first cluster or the second cluster.

Since the mobile object or vehicle locations spaced relatively close to each other are clustered directly, and the remaining learned data are clustered based on the road segment information, a relatively narrow range corresponding to a specific region, such as a parking lot in a park, and a range extending a long length, such a road, can be individually differentiated.

According to a further aspect of the present invention, there is provided a control method for use in a controller having a storage unit, a control information correcting unit, having at least one probabilistic model associated with a specific setting operation, for calculating a recommended probability of a user performing the specific setting operation by inputting location information into the probabilistic model, and for correcting setting information or control information related to the setting operation of the user in accordance with the recommended probability so as to achieve the specific setting operation, and a control unit for controlling an apparatus mounted in a mobile object in accordance with the corrected setting information or control information.

The control method includes: acquiring the location information; a step for acquiring road segment information indicating a specific segment of a road; associating the location information with the road segment information corresponding to the location indicated by the location information; storing a plurality of pieces of location information and road segment information respectively as learned data into the storage unit; clustering the plurality of pieces of road segment information included in the learned data stored in the storage unit into at least a first cluster or a second cluster; determining a first range for the location of the mobile object from the road segment information included in the first cluster, and determining a second range for the location of the mobile object from the road segment information included in the second cluster; and constructing the probabilistic model by determining the recommended probability for the mobile object location contained in the first range and the recommended probability for the mobile object location contained in the second range.

According to a still further aspect of the present invention, there is provided a control method for an automotive air conditioner having an air-conditioning unit for supplying conditioned air into a vehicle, a storage unit, a control information correcting unit, having at least one probabilistic model associated with a specific setting operation, for calculating a recommended probability of a vehicle occupant performing the specific setting operation by inputting location information indicating a location of the vehicle into the probabilistic model, and for correcting setting information or control information related to the setting operation of the occupant in accordance with the recommended probability so as to achieve the specific setting operation, and an air-conditioning control unit for controlling the air-conditioning unit in accordance with the corrected setting information or control information. The control method includes: acquiring the location information; acquiring road segment information indicating a specific segment of a road; associating the location information with the road segment information corresponding to the location indicated by the location information; storing a plurality of pieces of location information and road segment information respectively as learned data into the storage unit; clustering the plurality of pieces of road segment information included in the learned data stored in the storage unit into at least a first cluster or a second cluster; determining a first range for the location of the vehicle from the road segment information included in the first cluster, and determining a second range for the location of the vehicle from the road segment information included in the second cluster; and constructing the probabilistic model by determining the recommended probability for the vehicle location contained in the first range and the recommended probability for the vehicle location contained in the second range.

Preferably, in any one of the above methods, the determining the first range indicates the first range by identification information identifying the road segment information included in the first cluster.

Preferably, any one of the above methods further includes clustering, from among the plurality of pieces of location information included in the learned data, the location information whose distance relative to each other is not greater than a predetermined value into at least one third cluster, and the clustering the plurality of pieces of road segment information into at least the first cluster or the second cluster, clusters the road segment information with which the location information not included in the at least one third cluster is associated into the first cluster or the second cluster.

In each of the above aspects of the invention, the location range setting unit (subunit) or the location range setting step determines the first range so as to contain all the learned data included in the first cluster but not contain any learned data included in the second cluster, and determines the second range so as to contain all the learned data included in the second cluster but not contain any learned data included in the first cluster.

DESCRIPTION OF THE DRAWINGS

These and other features and advantages of the present invention will be better understood by referring to the following detailed description, taken together with the drawings wherein:

FIGS. 5A to 5C are diagrams showing conditional probability tables for the input nodes of the probabilistic model shown in FIG. 4;

FIG. 5D is a diagram showing a conditional probability table for the output node of the probabilistic model shown in FIG. 4;

FIGS. 6A and 6B are a flowchart showing a learned information clustering procedure of the automotive air conditioner according to the present invention;

FIGS. 7A to 7C are diagrams showing one example of the distribution of current locations where a specific setting operation is performed;

FIG. 11 is a functional block diagram of a car audio control apparatus to which the present invention is applied.

DESCRIPTION OF THE PREFERRED EMBODIMENT

An apparatus and method according to the present invention will be described below with reference to the drawings. However, it should be noted that the present invention is not limited by the description given herein, but embraces the inventions described in the appended claims and their equivalents.

An automotive air conditioner according to the present invention will be described below.

The automotive air conditioner according to the present invention estimates the air conditioner setting operation to be performed by a vehicle occupant, based on at least one probabilistic model that has been learned in accordance with a specific situation, and automatically executes the air conditioner setting. More particularly, in generating the probabilistic model, the automotive air conditioner determines the vehicle location range corresponding to the specific situation by reference to a specific segment of a road; then, based on the result, the probabilistic model for calculating the probability is constructed so that the air conditioner setting that matches the specific situation can be automatically executed.

Figure 1:
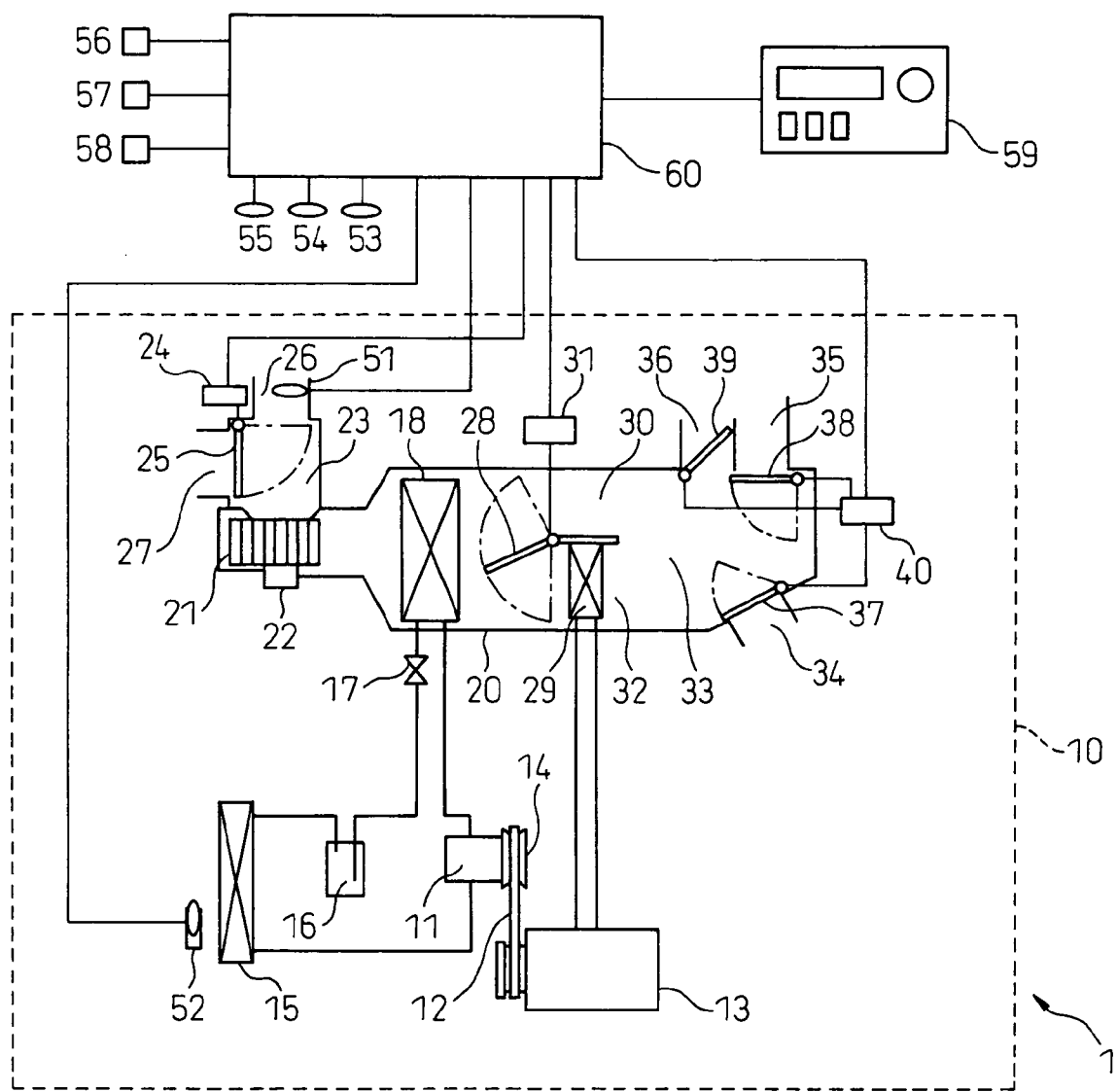
FIG. 1 is a diagram showing the general configuration of an automotive air conditioner according to the present invention.

FIG. 1 is a diagram showing the general configuration of the automotive air conditioner 1. As shown in FIG. 1, the automotive air conditioner 1 includes an air-conditioning unit 10 comprised mainly of mechanical components, and a controller 60 for controlling the air-conditioning unit 10.

First, the structure of the refrigeration cycle R of the air-conditioning unit 10 will be described. The refrigeration cycle R of the automotive air conditioner 1 is formed from a closed circuit, which comprises a compressor 11, a condenser 15, a receiver 16, an expansion valve 17, and an evaporator 18 arranged in this order in a clockwise direction. The compressor 11 compresses refrigerant and changes it into a high-pressure gas. The compressor 11 is equipped with an electromagnetic clutch 14 for connecting and disconnecting the power being transmitted from an automotive engine 13 via a belt 12. The condenser 15 cools the high-temperature, high-pressure refrigerant gas discharged from the compressor 11 and changes it into a liquid. The receiver 16 stores the liquid refrigerant. To prevent the cooling performance from dropping, the receiver 16 removes gas bubbles contained in the liquid refrigerant, and supplies only the completely liquefied refrigerant to the expansion valve 17. The expansion valve 17 causes the liquid refrigerant to undergo adiabatic expansion and thereby changes it into a low-temperature, low-pressure refrigerant which flows into the evaporator 18. The evaporator 18 performs heat exchange between the low-temperature, low-pressure refrigerant and the air forced to flow over the evaporator 18 which thus cools the air.

Next, the structure inside an air conditioning housing 20 in the air-conditioning unit 10 will be described. A blower fan 21 is located on the upstream side of the evaporator 18. The blower fan is a centrifugal blower fan which is driven by a drive motor 22. An inside/outside air switching box 23 is located on the suction side of the blower fan 21. An inside/outside air switching door 25, which is driven by an inside/outside air servo motor 24, is mounted inside the inside/outside air switching box 23. The inside/outside air switching door 25 is operated between an inside air inlet 26 and an outside air inlet 27. The air drawn through the inside air inlet 26 or the outside air inlet 27 passes through the inside/outside air switching box 23 and is delivered by the blower fan 21 to the evaporator 18. Here, the amount of air to be delivered from the automotive air conditioner 1 can be adjusted by regulating the rotational speed of the blower fan 21.

An air mix door 28 and a heater core 29 are arranged in this order on the downstream side of the evaporator 18. Coolant used to cool the automotive engine 13 is circulated passing through the heater core 29 in order to heat the air passing over the heater core 29. A bypass passage 30 that bypasses the heater core 29 is formed inside the air conditioning housing 20. The air mix door 28 is turned by a temperature control servo motor 31 and adjusts the airflow ratio between the hot air passing through a passage 32 over the heater core 29 and the cold air passing through the bypass passage 30 so that the air controlled to the desired temperature is discharged from the air outlets.

A foot-level outlet 34, a face-level outlet 35, and a defroster outlet 36, through which the conditioned air is blown into the passenger compartment, are provided on the downstream side of an air mixing section 33 where the cold air passed through the bypass passage 30 and the hot air passed through the passage 32 over the heater core 29 are mixed together. A foot-level door 37, a face-level door 38, and a defroster door 39 for opening and closing the respective outlets are provided on the respective outlets. The foot-level outlet 34 is for blowing the conditioned air to the foot level of the driver's seat or the passenger seat. The face-level outlet 35 is for blowing the conditioned air toward the driver's seat or the passenger seat from the front panel. On the other hand, the defroster outlet 36 is for blowing the conditioned air toward the windshield. The doors 37, 38, and 39 are driven by a mode servo motor 40.

Next, a description will be given of various sensors that together function as an information acquiring unit in the automotive air conditioner 1. An inside temperature sensor 51 is mounted together with an aspirator in the instrument panel or the like at a position near the steering wheel in order to measure the temperature $T_r$ inside the passenger compartment. An outside temperature sensor 52 is mounted in the radiator grille on the front side of the condenser 15 at the front end of the vehicle in order to measure the temperature $T_{am}$ outside the passenger compartment. Further, a solar sensor 53 is mounted inside the passenger compartment at a position near the windshield in order to measure the intensity (amount) of solar radiation S entering the passenger compartment. The solar sensor 53 is constructed from a photodiode or the like.

There are also provided such sensors as an evaporator outlet temperature sensor for measuring the temperature of the air (evaporator outlet temperature) leaving the evaporator 18, a heater inlet coolant temperature sensor for measuring the temperature of the engine coolant flowing into the heater core 29, and a pressure sensor for measuring the pressure of the refrigerant circulating through the refrigeration cycle R. In addition, at least one in-car camera 54 for shooting the faces of the occupants seated in the driver's seat and other seats, which also functions as an occupant information acquiring unit, is mounted inside the passenger compartment. Further, an outside camera 55 is mounted for viewing outside the vehicle.

The air conditioner 1 acquires, from a navigation system 56, location information indicating the current location as well as the heading direction of the vehicle and road segment information indicating a specific segment of a road that corresponds to the vehicle's location indicated by the location information. For this purpose, the navigation system 56 includes a location information acquiring unit for acquiring the location information, a road information acquiring unit for acquiring the road segment information indicating a specific segment of a road, and a segment determining unit for associating the location information with the road segment information.

The location information acquiring unit detects the current location and the heading direction of the vehicle equipped with the air conditioner 1. For this purpose, the location information acquiring unit includes sensors, such as a geomagnetic sensor, a gyroscope, and a distance sensor, and a GPS receiver. The geomagnetic sensor is used to acquire absolute heading, while the gyroscope is used to detect relative heading. The distance sensor is used to calculate traveled distance from a starting point, based on vehicle speed pulse signals. On the other hand, the GPS receiver obtains the latitude and longitude of the vehicle's current location, based on the information received from GPS satellites forming the GPS (Global Positioning System). By combining these pieces of information, the location information acquiring unit detects the current location and the heading direction of the vehicle. The geomagnetic sensor, the gyroscope, the distance sensor, and the GPS receiver are well known in the art, and therefore, will not be discussed in detail here. The method of detecting the vehicle's location and heading direction by combining the information acquired from the various sensors is also known in the art, and will not be discussed in detail here.

The road information acquiring unit acquires a road map containing the road information for an area surrounding the vehicle's current location, and transmits the road map to the controller 60. For this purpose, the road information acquiring unit includes, for example, a magnetic recording medium such as a HDD or a magneto-optical recording medium such as a DVD or a CD with map information recorded thereon, and a device for reading the recording medium. Here, the road information comprises nodes that indicate intersections and links that indicate roads connecting between the respective intersections. Such nodes and links correspond to the road segment information indicating a specific segment of a road. Each node is associated with identification information for the node, the position of the node, identification information for the links connected to the node, etc. Each link is associated with identification information for the link, the position and length of the link, the type of the road (for example, an ordinary road or an expressway), information concerning one-way traffic, etc. Here, the road information acquiring unit may be configured to acquire the map information from an external server via a radio communication network.

Each time the location information is acquired from the location information acquiring unit, the segment determining unit performs map matching by comparing the location information with the road information acquired from the road information acquiring unit, and determines whether there is a road that matches the vehicle location indicated by the location information. If it is determined that there is a matching road, the segment determining unit associates the location information corresponding to the vehicle location with the road segment information (that is, a link or node) indicating the road that matches the vehicle location. Since a known method can be used for map matching, the details of the map matching will not be described here. If it is determined that there is no matching road, the segment determining unit does not associate the location information corresponding to the vehicle location with any road segment information.

The automotive air conditioner 1 also acquires various kinds of operation information, such as throttle opening, steering wheel angle, brake pedal position, power window opening, and wiper, turn signal, or car audio ON/OFF state, as well as vehicle speed and vehicle behavior information, from vehicle operation apparatus 57. The automotive air conditioner 1 further acquires time information such as the current date and time from a vehicle-mounted clock 58. Further, an electrocardiographic detection sensor, a heartbeat/respiration sensor, a body temperature sensor, a skin temperature sensor, or the like may be mounted in the driver's seat, etc. so that the automotive air conditioner 1 can acquire physiological information concerning the occupant.

In this way, the navigation system 56, the vehicle operation apparatus 57, and the vehicle-mounted clock 58 also function as an information acquiring unit.

Figure 2:
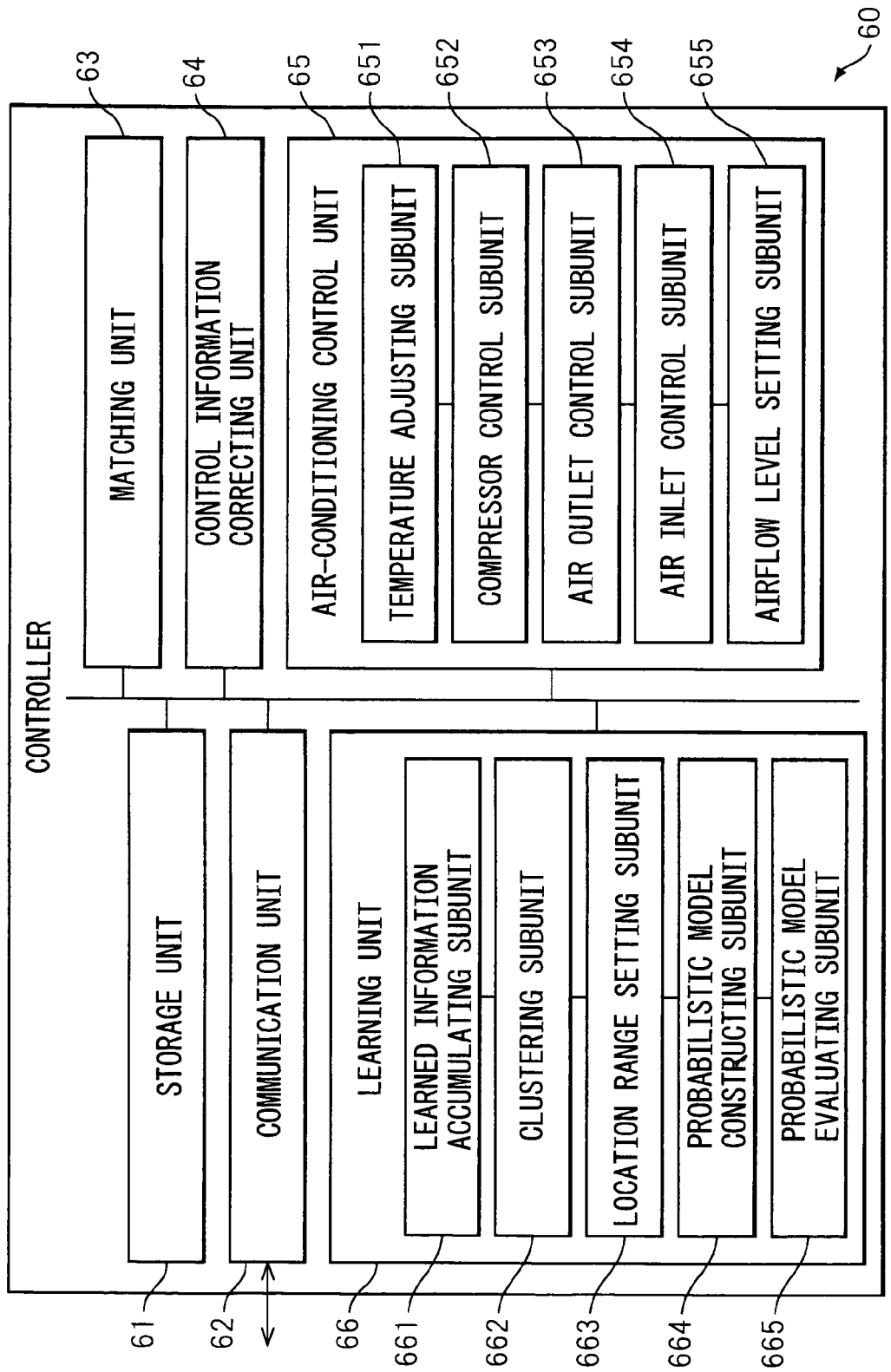
FIG. 2 is a functional block diagram of a controller in the automotive air conditioner.

FIG. 2 is a functional block diagram of the controller 60 in the automotive air conditioner 1.

The controller 60 includes: one or more microcomputers not shown, each comprising a CPU, ROM, RAM, etc., and their peripheral circuits; a storage unit 61 constructed from an electrically alterable nonvolatile memory or the like; and a communication unit 62 for performing communications with the various sensors, the navigation system 56, the vehicle operation apparatus 57, etc. in compliance with an automotive communication standard such as Control Area Network (CAN).

The controller 60 further includes a matching unit 63, a control information correcting unit 64, an air-conditioning control unit 65, and a learning unit 66, each implemented as a functional module by a computer program executed on the microcomputer.

The controller 60 acquires state information such as the sensing information, location information, and vehicle behavior information from the various sensors, navigation system, vehicle operation apparatus, etc., and temporarily stores them into the RAM. The controller 60 also stores operation signals acquired from an A/C operation panel 59 temporarily into the RAM. Then, the controller 60 controls the air-conditioning unit 10 based on the state information and the operation signals. For example, the controller 60 controls the electromagnetic clutch 14 to turn the compressor 11 on and off, or controls the drive motor 22 to regulate the rotational speed of the blower fan 21. Further, the controller 60 controls the inside/outside air servo motor 24, temperature control servo motor 31, and mode servo motor 40 to adjust the openings of the various doors. By performing these control operations, the controller 60 adjusts the ratio of the conditioned air between the various air outlets, the total amount of air, and the temperature of the conditioned air so that the temperature inside the passenger compartment is brought as close as possible to the temperature set by the occupant. Here, to determine the temperature, airflow level, etc. of the conditioned air, the controller 60 inputs prescribed state information into an applicable probabilistic model and estimates the probability that the occupant performs a specific operation (for example, to lower the temperature setting, set the airflow level to maximum, set the air conditioner to the inside air recirculation mode, etc.). If the probability is greater than a predetermined threshold value, the controller 60 automatically executes that specific operation.

The controller 60 stores the state information, etc. at periodic intervals of time. Alternatively, each time the occupant operates the automotive air conditioner 1, the controller 60 stores the kind of the operation performed and the various kinds of information obtained at the time of the operation. When such information has been stored a predetermined number of times, the controller 60 generates a probabilistic model through statistical learning. The functional modules for performing the above operations will be described below.

When the engine switch is turned on, the matching unit 63 performs the matching and authentication of the occupant based on the image captured by the in-car camera 54 and on the matching information concerning the registered users preregistered in the automotive air conditioner 1, and determines whether the occupant matches any one of the registered users. When a registered user is found that matches the occupant, the matching unit 63 retrieves the identification information (ID) of the matching registered user and the personal information associated with that registered user from the storage unit 61.

Here, the matching unit 63 performs the matching and authentication of the occupant, for example, in accordance with the following method. The matching unit 63 binarizes the image captured by the in-car camera 54 and detects edges in the image to discriminate a region corresponding to the face of the occupant. Then, the matching unit 63 detects features such as eyes, nose, lips, etc., in the thus discriminated face region by such means as edge detection, and extracts a set of feature amounts representing the sizes of the features, their positional relationships relative to each other, etc. Next, the matching unit 63 compares the set of the extracted feature amounts against the sets of feature amounts obtained from the registered users and stored in advance in the storage unit 61, and computes the degree of matching by using, for example, a correlation computation method. If the highest degree of matching thus obtained is greater than a predetermined threshold value, the matching unit 63 authenticates the occupant as matching the registered user that yielded the highest degree of matching. The above matching method is only one example, and it will be appreciated that the matching unit 63 can perform the matching and authentication of the occupant by using other known matching methods. For example, the matching unit 63 can use a face authentication system proposed in Japanese Unexamined Patent Publication No. 2005-202786 for automotive applications. The matching unit 63 can also use methods other than image authentication. For example, the matching unit 63 may be configured to perform the matching and authentication of the occupant by using a smart key system. Furthermore, the matching unit 63 may be configured to perform the matching and authentication of the occupant by combining a smart key system with image authentication, as in the vehicle theft prevention device disclosed in Japanese Unexamined Patent Publication No. 2005-67353. Further, the matching unit 63 may use a sensor for reading a palm or finger vein pattern or a fingerprint for authentication of the occupant.

The control information correcting unit 64 determines whether the setting parameter of the air conditioner 1, i.e., the occupant-settable setting information such as set temperature $T_{set}$ or airflow level W, should be automatically adjusted based on the probabilistic model. More specifically, the control information correcting unit 64 has at least one probabilistic model associated with a specific setting operation, and calculates the recommended probability of the specific setting operation by inputting the state information into the probabilistic model. Then, based on the recommended probability and the correction information associated with the probabilistic model, the control information correcting unit 64 corrects the setting information related to the specific setting operation. Here, the correction information associated with the probabilistic model refers to the value of the setting information after correction in the correction defined by the probabilistic model or to the amount of correction to be added to or by which to multiply the setting information in order to correct the setting information to the desired value.

In the present embodiment, a Bayesian network is used as the probabilistic model. A Bayesian network models probabilistic causality relationships among a plurality of events. Further, a Bayesian network is a network represented by a directed acyclic graph in which propagation between each node is obtained by a conditional probability. For the details of Bayesian networks, refer to "Bayesian Network Technology" by Yoichi Motomura and Hirotoshi Iwasaki, 1st Edition, Tokyo Denki University Press, July 2006, "Introduction to Bayesian Networks" by Kazuo Shigemasu et al., 1st Edition, Baifukan, July 2006, or "Pattern Recognition" translated by Morio Onoe, 1st Edition, Shin Gijutsu Communications, July 2001.

In the present embodiment, the probabilistic model is generated for each user registered in the automotive air conditioner 1. Further, the probabilistic model is generated for each kind of setting operation (for example, lower or raise the set temperature $T_{set}$, adjust the airflow level W, set the air conditioner to the inside air recirculation mode, etc.). The structural information of each probabilistic model is stored in the storage unit 61 by being associated with the corresponding user information and setting operation. More specifically, the graph structure showing the connections between the nodes forming the probabilistic model, the type of input information given to the input node, and the conditional probability table (CPT) of each node are defined for each probabilistic model and stored in the storage unit 61. Further, the user identification number (ID), the setting operation number k that uniquely corresponds to the kind of setting operation, and the setting parameter to be corrected by the setting operation and its correction value (for example, ($T_{set}$, −3) when lowering the set temperature $T_{set}$ by 3° C., (W, $W_{max}$) when setting the air flow level W to maximum $W_{max}$, etc.) are also defined for each probabilistic model and stored in the storage unit 61 by being associated with the probabilistic model.

The control information correcting unit 64 retrieves from the storage unit 61 one or more probabilistic models associated with the registered user identified by the matching unit 63 as matching the occupant. The control information correcting unit 64 inputs prescribed state information into each of the retrieved probabilistic models and obtains the recommended probability that the occupant performs the setting operation associated with the probabilistic model. More specifically, the control information correcting unit 64 obtains the probability that the setting operation uniquely identified in relation to the probabilistic model and designated by the setting operation number k stored in the storage unit 61 together with that probabilistic model is performed. The probability can be calculated by using, for example, a belief propagation method. When the thus obtained probability is greater than or equal to a first threshold value Th1 (for example, Th1=0.9) (this indicates that it is almost certain that the occupant will perform that setting operation), the control information correcting unit 64 automatically executes that setting operation. More specifically, the control information correcting unit 64 corrects the value of the setting parameter of that setting operation by using the correction value of the setting parameter associated with the probabilistic model, that is, the correction value of the setting parameter uniquely defined in relation to the probabilistic model and stored in the storage unit 61 together with that probabilistic model.

On the other hand, when the obtained probability is smaller than the first threshold value Th1 but not smaller than a second threshold value Th2 (for example, Th2=0.6) (this indicates that it is highly likely that the occupant will perform that setting operation), the control information correcting unit 64 displays the kind of the setting operation on the A/C operation panel 59 or on the display unit of the navigation system 56 or the like to notify the occupant. The control information correcting unit 64 thus queries the occupant whether the setting operation should be executed or not. When the occupant responds by performing an operation for approving the execution of the setting operation (for example, by depressing a designated operation button) through the A/C operation panel 59 or the like, the control information correcting unit 64 executes the setting operation. The control information correcting unit 64 may be configured to notify the occupant of the kind of the setting operation by voice through the A/C operation panel 59 or the navigation system 56. Further, a microphone may be connected to the automotive air conditioner 1, and a voice recognition program may be incorporated in the controller 60 so that the control information correcting unit 64 can determine whether to execute or not to execute the setting operation, by responding to the occupant's voice.

A description will be given below by taking as an example the case where the set temperature $T_{set}$ is lowered by 3° C. Here, the first threshold value Th1 is set to 0.9, and the second threshold value Th2 to 0.6.

Figure 3:
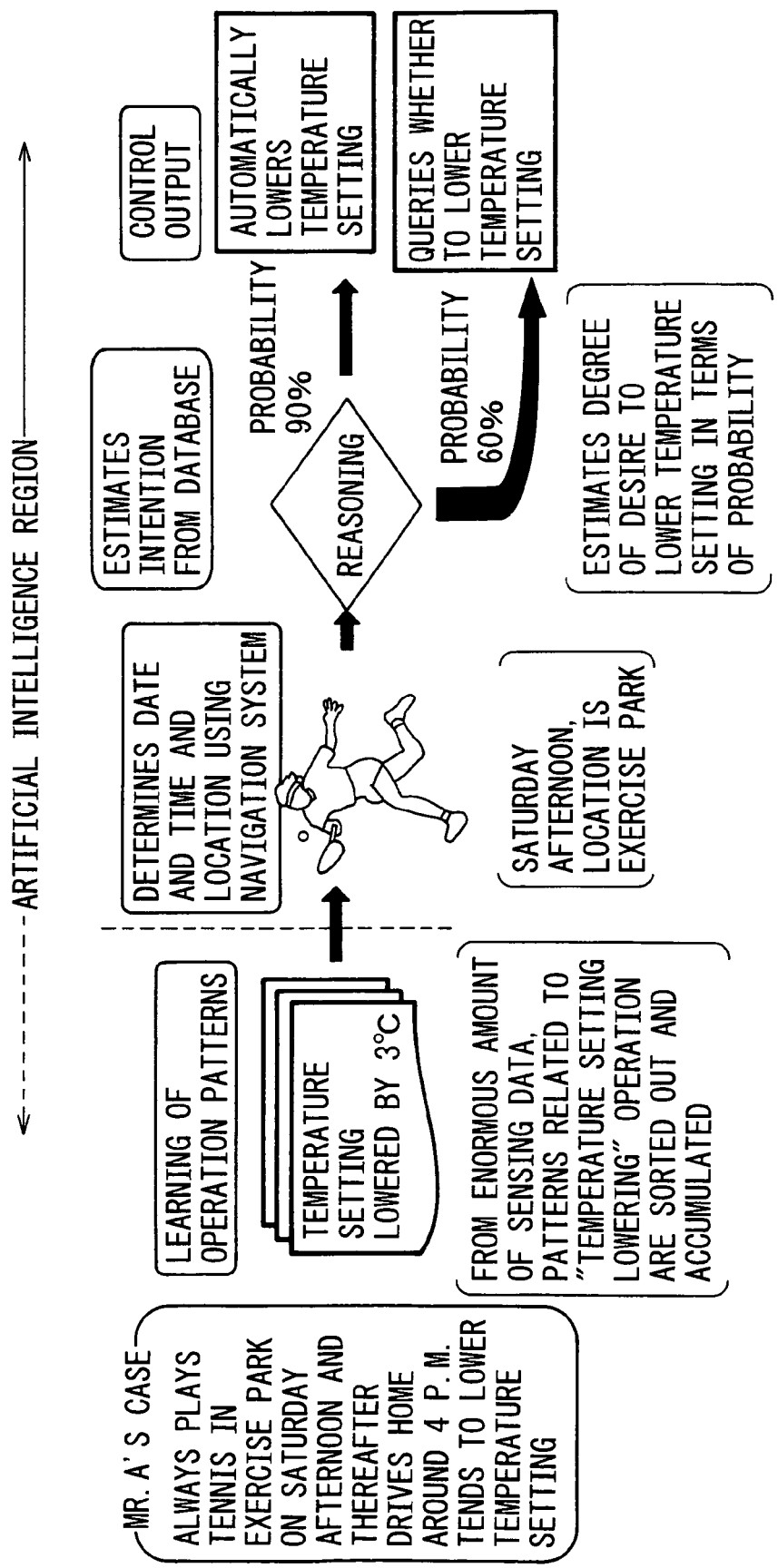
FIG. 3 is a diagram showing one example of a specific situation.

FIG. 3 shows one example of such a specific situation. In the situation shown here, it is assumed that the occupant (Mr. A) always plays tennis in an exercise park on Saturday afternoon and thereafter drives his car home around 4 p.m. It is assumed that, in this situation, Mr. A prefers to set the automotive air conditioner for a lower temperature than usual. In other situations, for example, when driving home after work, he does not perform such a setting operation.

Figure 4:
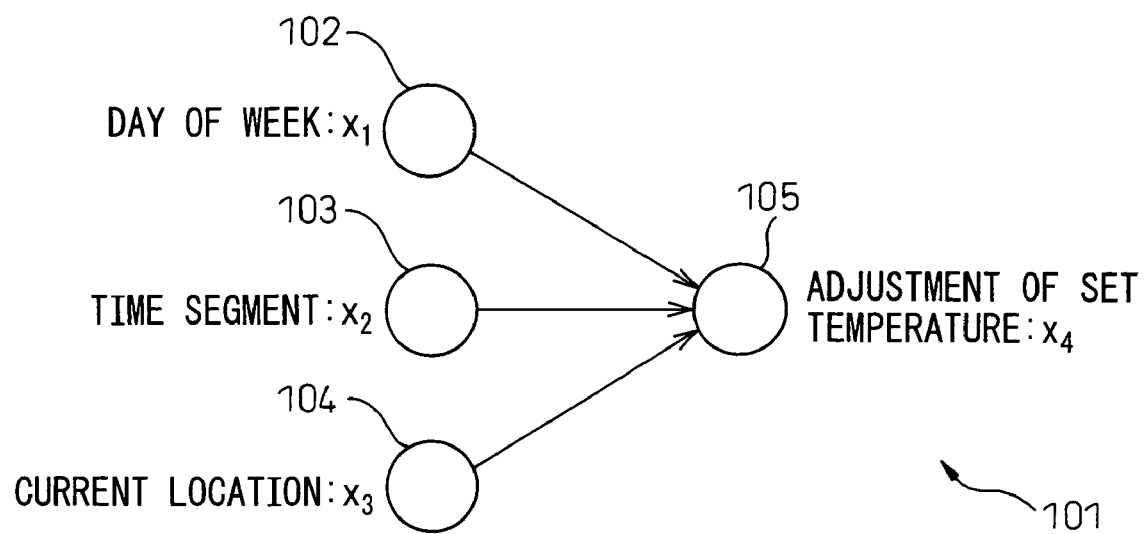
FIG. 4 is a diagram showing a graph structure for one example of a probabilistic model used for automatically adjusting a set value in the automotive air conditioner.

FIG. 4 shows a graph structure for one example of the probabilistic model used to automatically adjust the setting parameter of the automotive air conditioner 1. In the probabilistic model 101 shown in FIG. 4, three input nodes 102, 103, and 104 are connected to an output node 105. Day of week ($X_1$), time segment ($X_2$), and current location ($X_3$) are given as state information to the respective input nodes 102, 103, and 104. The output node 105 outputs the probability of the set temperature $T_{set}$ being lowered by 3° C.

FIGS. 5A to 5D show CPTs 106 to 109 for the respective nodes in the probabilistic model 101 shown in FIG. 4. The CPTs 106 to 108 correspond to the input nodes 102 to 104, respectively. The CPTs 106 to 108 each provide the prior probability of the input state information. The CPT 109 corresponds to the output node 105, and provides the distribution of the conditional probabilities allocated to the various values of the information given to the respective input nodes.

When all of the information given to the respective input nodes is known, i.e., when the day of week is Saturday ($X_1$=1), the time segment is daytime ($X_2$=1), and the current location is the park ($X_3$=1), for example, it can be seen from FIG. 5D that the probability, $P(X_4=1|X_1=1, X_2=1, X_3=1)$, of the set temperature $T_{set}$ being lowered by 3° C. is 0.95. Since the recommended probability obtained here is greater than the first threshold value Th1, the control information correcting unit 64 corrects the setting parameter so as to lower the set temperature $T_{set}$ by 3° C.

On the other hand, when the day of week is Saturday ($X_1$=1) and the time segment is daytime ($X_2$=1), but it is not possible to determine the current location because power is not turned on to the navigation system 56, for example, then $P(X_4=1|X_1=1, X_2=1, X_3)$ is calculated as shown below by using the prior probability $P(X_3)$ shown in FIG. 5C for the case where the current location is the park.

$$P\binom{X_4 = 1 \mid X_1 = 1,}{X_2 = 1, X_3} = P\binom{X_4 = 1 \mid X_1 = 1,}{X_2 = 1, X_3 = 1} \cdot P(X_3 = 1) +$$
$$P\binom{X_4 = 1 \mid X_1 = 1,}{X_2 = 1, X_3 = 0} \cdot P(X_3 = 0)$$
$$= 0.95 \cdot 0.15 + 0.55 \cdot 0.85$$
$$= 0.61$$

Since the obtained probability is smaller than the first threshold value Th1 but greater than the second threshold value Th2, the control information correcting unit 64 queries the occupant via the A/C operation panel 59 or the like whether or not the set temperature $T_{set}$ should be lowered by 3° C.

Further, when the day of week is Monday ($X_1$=0), the time segment is nighttime ($X_2$=0), and the current location is the office ($X_3$=0) it can be seen from FIG. 5D that the probability, $P(X_4=1|X_1=0, X_2=0, X_3=0)$, of the set temperature $T_{set}$ being lowered by 3° C. is 0.1. Since the obtained probability is smaller than not only the first threshold value Th1 but also the second threshold value Th2, the control information correcting unit 64 does not change the set temperature $T_{set}$, nor does it query the occupant whether to change the set temperature $T_{set}$.

In the above example, the probabilistic model has been described as having a two-layer network structure for simplicity, but the probabilistic model may be constructed from a network structure with three or more layers including an intermediate layer. Further, the classification of the state information given to the respective input nodes is not limited to the above example. The classification of the state information will be described later in connection with the learning unit 66.

When there is more than one probabilistic model associated with the same operation group (the groups are classified according to the kind of operation, for example, temperature setting correction, airflow level change, inside/outside air selection, airflow ratio setting, etc.), that is, when there is more than one probabilistic model that outputs the probability of correcting a specific setting parameter, the control information correcting unit 64 calculates the probability based on each of such probabilistic models. The specific setting parameters here include those of airflow level setting, inside/outside air selection, and airflow ratio setting. The control information correcting unit 64 performs the above operation by selecting the greatest probability from among the obtained probabilities. For example, consider the case where there are probabilistic models M1 (for setting the airflow level W to maximum) and M2 (for setting the airflow level W to a medium level) associated with the airflow level setting. In this case, the control information correcting unit 64, based on the probabilistic model M1, obtains the probability $P_{M1}$ of the airflow level W being set to maximum and, based on the probabilistic model M2, calculates the probability $P_{M2}$ of the airflow level W being set to a medium level. If $P_{M1}>P_{M2}$, the control information correcting unit 64 compares $P_{M1}$ with the threshold values Th1 and Th2 to determine whether to set the airflow level W to maximum. Conversely, if $P_{M2}>P_{M1}$, the control information correcting unit 64 compares $P_{M2}$ with the threshold values Th1 and Th2 to determine whether to set the airflow level W to a medium level.

For ease of understanding, in the above example, the probabilistic models M1 and M2 have been described as being associated with different setting operations. However, the probabilistic models M1 and M2 may be associated with the same setting operation (for example, both for setting the airflow level W to maximum). This corresponds, for example, to the case where the occupant may perform the same operation in two or more different situations (for example, one in which the time segment is daytime and the weather is fine, and the other in which the occupant is on the way home from a fitness club). If probabilistic models corresponding to the respective situations are generated, the probabilistic models will be associated with the setting operation belonging to the same operation group.

When the setting parameters such as set temperature $T_{set}$ and airflow level W are corrected as needed as described above, the control information correcting unit 64 temporarily stores the corrected setting parameters in the RAM of the controller 60 so that the parameters can be used by the various units in the controller 60.

The air-conditioning control unit 65 reads from the RAM the value of each setting parameter and the sensing information acquired from each sensor, and controls the air-conditioning unit 10 based on the readout values. For this purpose, the air-conditioning control unit 65 includes a temperature adjusting subunit 651, a compressor control subunit 652, an air outlet control subunit 653, an air inlet control subunit 654, and an airflow level setting subunit 655. When the setting parameter corrected by the control information correcting unit 64 is stored in the RAM, the air-conditioning control unit 65 uses the corrected parameter by retrieving it from the RAM.

The temperature adjusting subunit 651, based on the set temperature $T_{set}$ and the measurement signals from the temperature sensors and the solar sensor 53, determines the outlet temperature of the conditioned air (air conditioning temperature $T_{ao}$) to be discharged from the air outlets. Then, the temperature adjusting subunit 651 determines the opening of the air mix door 28 so that the temperature of the conditioned air will become substantially identical with the air conditioning temperature $T_{ao}$. The temperature adjusting subunit 651 sends a control signal to the temperature control servo motor 31, which then moves the air mix door 28 to the thus determined position. The opening of the air mix door 28 is determined, for example, based on a mathematical relation that takes as an input a value obtained by correcting the difference between the inside temperature $T_r$ and the set temperature $T_{set}$ by the outside temperature $T_{am}$, the amount of solar radiation S, etc., and that yields the opening of the air mix door 28 as an output. The temperature adjusting subunit 651 determines the opening of the air mix door 28 at predetermined intervals of time (for example, every five seconds). The mathematical relationship between the measurement values and the opening of the air mix door 28, for controlling the air mix door 28 in the above manner, is shown below.

$$T_{ao}=k_{set}T_{set}-k_rT_r-k_{am}T_{am}-k_sS+C$$

$$Do=aT_{ao}+b$$

Do indicates the opening of the air mix door 28. Further, the coefficients $k_{set}$, $k_r$, $k_{am}$, $k_s$, C, a, and b are constants, and $T_{set}$, $T_r$, $T_{am}$, and S denote the set temperature, the inside temperature, the outside temperature, and the amount of solar radiation, respectively. When the set temperature $T_{set}$ is corrected by the control information correcting unit 64, the temperature adjusting subunit 651 uses the corrected set temperature $T_{set}$. The opening Do of the air mix door 28 is 0% when the passage 32 passing through the heater core 29 is closed (that is, when providing only cooled air) and 100% when the bypass passage 30 is closed (that is, when providing only heated air). The coefficients $k_{set}$, $k_r$, $k_{am}$, $k_s$, and C in the temperature control equation and the coefficients a and b in the mathematical relationship for finding the opening of the air mix door are set as temperature control parameters for each registered user and included in the personal setting information of the registered user.

The temperature adjusting subunit 651 may be configured to determine the air conditioning temperature $T_{ao}$ and the opening of the air mix door 28 by using other known control methods such as a fussy control method or a control method that uses a neural network. The calculated air conditioning temperature $T_{ao}$ is stored in the storage unit 61 so that it can be referred to by other constituent units of the controller 60.

The compressor control subunit 652 controls the ON/OFF operation of the compressor 11 based on the air conditioning temperature (outlet air temperature) $T_{ao}$ obtained by the temperature adjusting subunit 651 as well as on the set temperature $T_{set}$, evaporator outlet temperature, etc. When the air conditioner 1 is operated to cool the passenger compartment or to run the defroster, the compressor control subunit 652 usually puts the refrigeration cycle R into operation by operating the compressor 11. However, when the evaporator outlet temperature drops to a level close to the temperature at which the evaporator 18 frosts, the compressor control subunit 652 turns off the compressor 11 in order to prevent the evaporator 18 from frosting. Then, when the evaporator outlet temperature increases up to a certain level, the compressor control subunit 652 turns on the compressor 11 again. The control of the compressor 11 can be performed using a known method such as a variable capacity control method, and therefore, the details of the control method will not be described herein.

The air outlet control subunit 653 determines the airflow ratio of the conditioned air between the various air outlets, based on the airflow ratio value set by the occupant from the A/C operation panel 59, the air conditioning temperature $T_{ao}$ determined by the temperature adjusting subunit 651, the set temperature $T_{set}$, etc. Then, the air outlet control subunit 653 determines the openings of the foot-level door 37, face-level door 38, and defroster door 39 so as to match the thus determined airflow ratio. The air outlet control subunit 653 determines the openings of the respective doors 37 to 39 in accordance with mathematical relations that define the relationships between the airflow ratio set value, air conditioning temperature $T_{ao}$, set temperature $T_{set}$, etc. and the openings of the respective doors 37 to 39. Such mathematical relations are predefined and incorporated into a computer program to be executed in the controller 60. Here, the air outlet control subunit 653 may determine the openings of the respective doors 37 to 39 by using other known methods. The air outlet control subunit 653 controls the mode servo motor 40 so that the doors 37 to 39 move to the respectively determined positions.

When the airflow ratio set value or the set temperature $T_{set}$ is corrected by the control information correcting unit 64, the air outlet control subunit 653 determines the openings of the respective doors 37 to 39 by using the corrected set value or set temperature $T_{set}$.

The air inlet control subunit 654 determines the ratio between the air that the automotive air conditioner 1 draws in through the inside air inlet 26 and the air that it draws in through the outside air inlet 27, based on the air inlet setting acquired from the A/C control panel 59 and on the set temperature $T_{set}$, the air conditioning temperature $T_{ao}$, the inside temperature $T_r$, etc. The air inlet control subunit 654 determines the opening of the inside/outside air switching door 25 in accordance with a mathematical relation that defines the relationship of the inlet air ratio relative to the outside temperature $T_{am}$, the difference between the inside temperature $T_r$ and the set temperature $T_{set}$, etc. Such a mathematical relation is predefined and incorporated into a computer program to be executed in the controller 60. Here, the air inlet control subunit 654 may determine the opening of the inside/outside air switching door 25 by using other known methods. The air inlet control subunit 654 controls the inside/outside air servo motor 24 and turns the inside/outside air switching door 25 so as to achieve the obtained inlet air ratio. When the inlet set value or the set temperature $T_{set}$ is corrected by the control information correcting unit 64, the air inlet control subunit 654 determines the opening of the inside/outside air switching door 25 by using the corrected inlet set value or set temperature $T_{set}$.

The airflow level setting subunit 655 determines the rotational speed of the blower fan 21 based on the airflow level W acquired from the A/C control panel 59 and on the set temperature $T_{set}$, the air conditioning temperature $T_{ao}$, the inside temperature $T_r$, the outside temperature $T_{am}$, and the amount of solar radiation S. Then, the airflow level setting subunit 655 sends a control signal to the drive motor 22 so that the blower fan 21 rotates at the thus determined rotational speed. For example, when the airflow level setting is in the manual setting mode, the airflow level setting subunit 655 determines the rotational speed of the blower fan 21 so that it matches the airflow level W acquired from the A/C control panel 59. On the other hand, when the airflow level setting is in the automatic setting mode, the airflow level setting subunit 655 determines the rotational speed of the blower fan 21 in accordance with an airflow level control equation that defines the relationship of the airflow level W relative to the inside temperature $T_r$, air conditioning temperature $T_{ao}$, etc. Alternatively, the airflow level setting subunit 655 may use an airflow level control equation that directly defines the relationship of the airflow level W relative to the set temperature $T_{set}$ and the air conditioning information (inside temperature $T_r$, outside temperature $T_{am}$, and amount of solar radiation S). In this way, the airflow level setting subunit 655 can use various known airflow level control equations. Such an airflow level control equation is predefined and incorporated into a computer program to be executed in the controller 60. Alternatively, a map defining the relationship between the air conditioning information and the airflow level W may be constructed in advance, and the airflow level setting subunit 655 may determine the rotational speed of the blower fan 21 based on a map control that determines the airflow level W corresponding to the measured air conditioning information by referring to the map. The airflow level setting subunit 655 can also determine the rotational speed of the blower fan 21 by using other known methods. When the airflow level W or the set temperature $T_{set}$ is corrected by the control information correcting unit 64, the airflow level setting subunit 655 determines the rotational speed of the blower fan 21 by using the corrected airflow level W or set temperature $T_{set}$.

When the occupant operates the automotive air conditioner 1, the learning unit 66 determines whether a new probabilistic model is to be generated or an existing probabilistic model is to be updated. When it is determined that a probabilistic model needs to be generated or updated, the learning unit 66 generates or updates the probabilistic model. For this purpose, the learning unit 66 includes a learned information accumulating subunit 661, a clustering subunit 662, a location range setting subunit 663, a probabilistic model constructing subunit 664, and a probabilistic model evaluating subunit 665. The various subunits contained in the learning unit 66 will be described in detail below.

The learned information accumulating subunit 661 associates the acquired state information with the setting operation performed by the occupant. Then, the learned information accumulating subunit 661 stores the state information in the storage unit 61 as the learned information necessary to construct a probabilistic model for estimating the setting operation to be performed by the occupant.

Generally, when the air conditioning state in the passenger compartment is not comfortable for the occupant, the occupant changes the setting of the automotive air conditioner 1. Accordingly, when the occupant frequently changes the setting of the automotive air conditioner 1, it may be necessary to construct a probabilistic model for estimating the setting operation to be performed by the occupant. However, for the construction of an appropriate probabilistic model, it will become necessary to gather a sufficient amount of data in order to make a statistically correct estimation. In view of this, each time the setting of the automotive air conditioner 1 is changed, the learned information accumulating subunit 661 stores the acquired state information (air conditioning information such as outside temperature $T_{am}$, location information such as the current location of the vehicle, vehicle behavior information such as the vehicle speed, physiological information such as the heart rate) as learned information $D_{Ak}$ in the storage unit 61. The learned information $D_{Ak}$ is stored by being associated with the setting operation number k and the occupant's ID. Alternatively, from among the state information gathered at periodic intervals of time irrespectively of the setting operation of the automotive air conditioner 1, the learned information accumulating subunit 661 may take the state information sampled at a time instant nearest to the time of the setting change operation or immediately before or after the time of the setting change operation, and may store it as the learned information $D_{Ak}$ into the storage unit 61 by associating it with the setting operation number k and the occupant's ID. Further, the learned information accumulating subunit 661 may sample the state information at periodic intervals of time (for example, every five seconds) irrespectively of the setting operation of the automotive air conditioner 1, and may store the state information sampled at each sampling instant into the storage unit 61 by associating it with the setting operation number k and the occupant's ID corresponding to the current setting state (for example, airflow level maximum). Alternatively, from the state information being gathered at periodic intervals of time, the learned information accumulating subunit 661 may sample the state information at periodic intervals of time (for example, every one or five minutes) and may store the thus sampled state information into the storage unit 61 by associating it with the setting operation number k and the occupant's ID corresponding to the current setting state. The learning unit 66 may use the state information thus gathered at periodic intervals of time for the construction of the probabilistic model.

Further, the learned information accumulating subunit 661 stores in the storage unit 61 the number, $i_{Ak}$, of times that a particular occupant A has performed the setting operation α corresponding to the setting operation number k (for example, the operation for lowering the set temperature by 3° C., for setting the airflow level W to maximum, or for setting the air inlet mode to the inside air recirculation mode). The above learned information $D_{Ak}$ is expressed, for example, by the following equation.

$$D_{Ak} = \begin{pmatrix} d_{11k} & d_{12k} & d_{13k} & \cdots & d_{1lk} \\ d_{21k} & d_{22k} & & & d_{2lk} \\ d_{31k} & & \ddots & & \\ \vdots & & & d_{ijk} & \\ d_{m1k} & & & & d_{mlk} \end{pmatrix}$$

where $d_{ijk}$ represents the value of each piece of state information. Here, i indicates the number, $i_{Ak}$, of times that the operation has been performed. On the other hand, j is the state item number assigned to each value of the state information for convenience; in the present embodiment, the inside temperature $T_r$ is assigned for j=1, the outside temperature $T_{am}$ is assigned for j=2, and the amount of solar radiation S is assigned for j=3. Then, the location information, the vehicle behavior information, the physiological information, etc. are assigned for j=4 and subsequent values of j. Further, k represents the setting operation number. The road segment information associated with the location information is also stored in the storage unit 61 as the learned information together with the location information.

The learned information $D_{Ak}$ and the number, $i_{Ak}$, of times that the operation has been performed are stored in the storage unit 61 for each registered user and for each setting operation.

The clustering subunit 662 selects, from among the various kinds of state information included in the learned data $D_{Ak}$, the location information that cannot be classified in advance into a plurality of classes, and performs clustering on such location information in order to construct a CPT for each node of the probabilistic model. Then, the location range setting subunit 663 determines the class of the vehicle location based on the plurality of clusters obtained by the clustering subunit 662.

There are cases where information whose possible values cannot be restricted to a given pattern or whose value varies continuously, for example, the vehicle's current location information, is used as the state information to be given to an input node of the probabilistic model. To construct a CPT that takes such information as an input parameter, how the value of the input state information is to be classified becomes an important issue. For example, consider the case of constructing a probabilistic model corresponding to the setting operation for lowering the set temperature by 3° C. in a specific situation where, after doing physical exercise, the occupant gets into the vehicle parked in the parking lot of the park, as shown in the example of FIG. 3. In this case, to use the vehicle location information as one of the various kinds of state information to be given to the input nodes of the probabilistic model, it is important to classify the vehicle location information by at least differentiating the case where the vehicle is located in the parking lot of the park from the case where the vehicle is located in some other place. Similarly, consider the case of constructing a probabilistic model corresponding to the setting operation for setting the air inlet mode to the inside air recirculation mode when the vehicle is traveling along a specific segment of a certain national road. In this case, to use the vehicle location information as one of the various kinds of state information to be given to the input nodes of the probabilistic model, it is important to differentiate the case where the vehicle is traveling along the specific segment of the national road from the case where the vehicle is located in some other place. As shown in these two examples, the vehicle location information differs not only in terms of the location but also in terms of the range it covers between the case where the vehicle is located in the parking lot of the park and the case where the vehicle is traveling on the national road; it is therefore clear that the vehicle location information cannot be classified in advance according to such specific situations.

In view of the above, the clustering subunit 662 performs clustering on the vehicle location information in two stages, first by classifying the information into narrow-range clusters and then by classifying it into wide-range clusters. Then, the clustering subunit 662 determines the class of the vehicle location so as to be able to address not only the case where the vehicle location corresponding to a specific situation is distributed over a narrow range but also the case where it is distributed over a wide range. In particular, in the wide range clustering stage, the clustering subunit 662 performs clustering on the road segment information associated with the location information stored as the learned information. By so doing, when a specific situation occurs on a specific segment of a road, the clustering subunit 662 can differentiate that specific segment from other regions.

The processing performed by the clustering subunit 662 and the location range setting subunit 663 will be described below with reference to a flowchart.

Figure 6B:
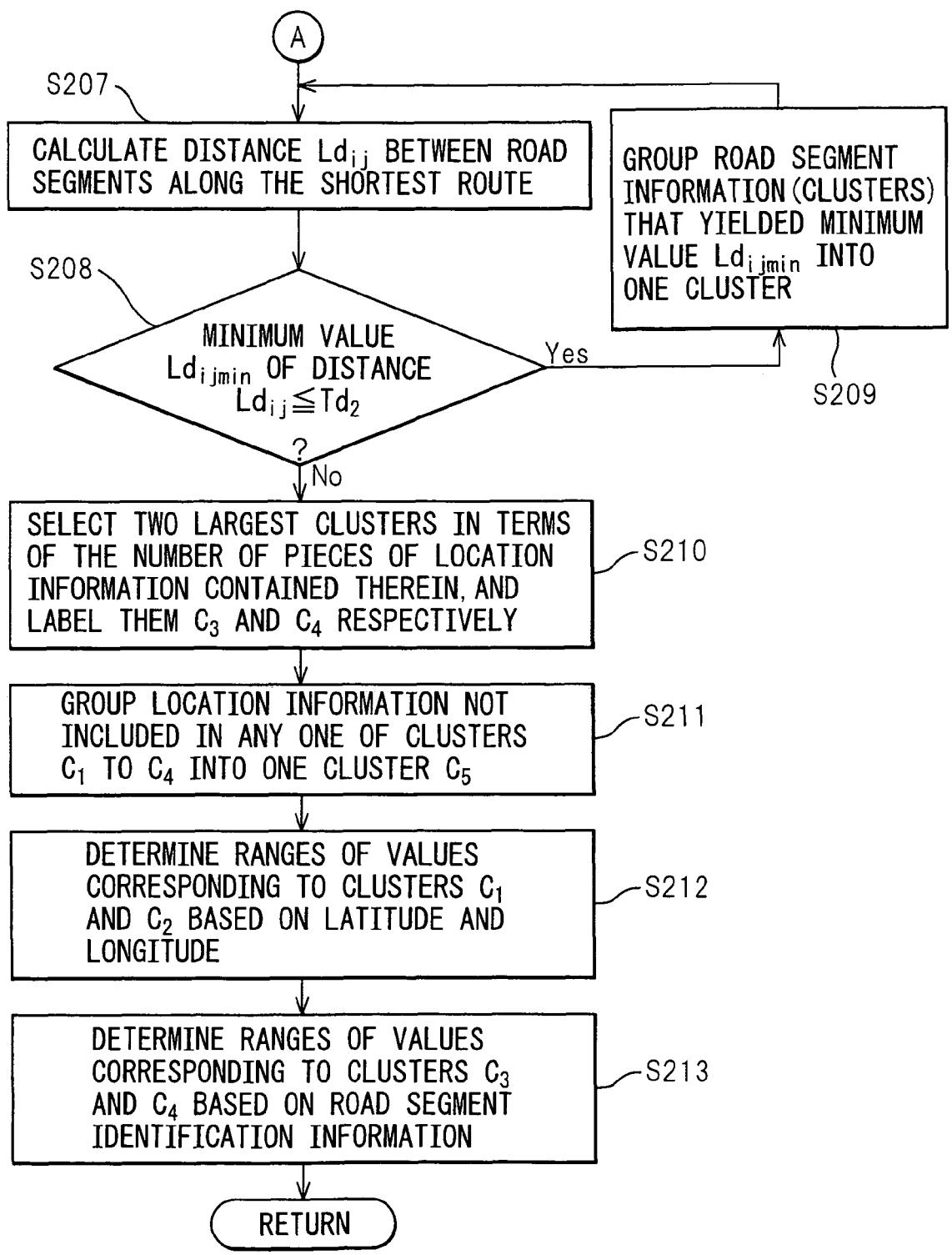
Figure 8A:
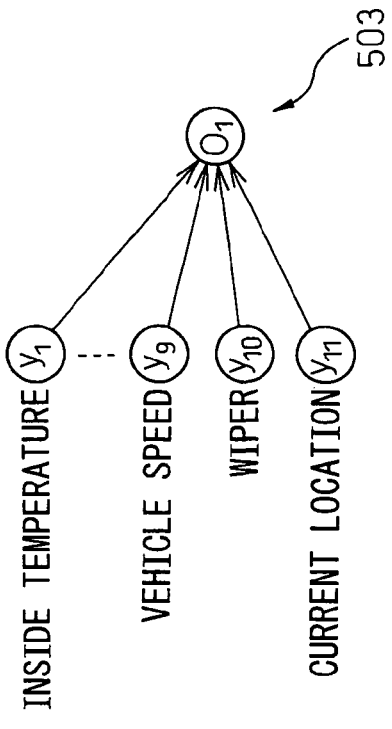
FIGS. 8A to 8D are diagrams showing standard models each having a graph structure that forms the basis of a probabilistic model.
Figure 8D:
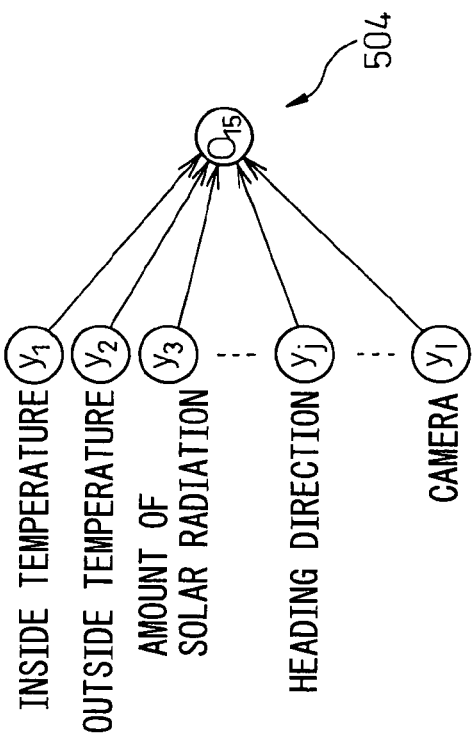
Figure 8C:
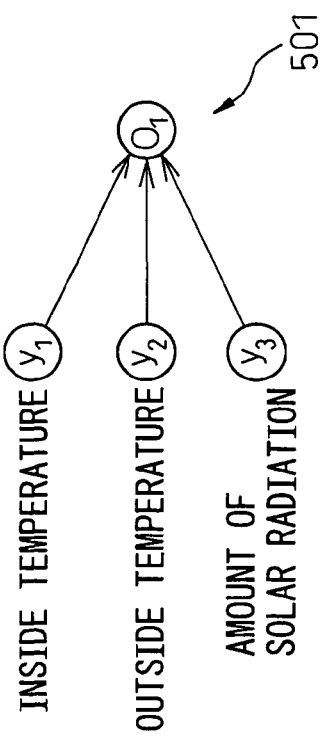
Figure 8B:
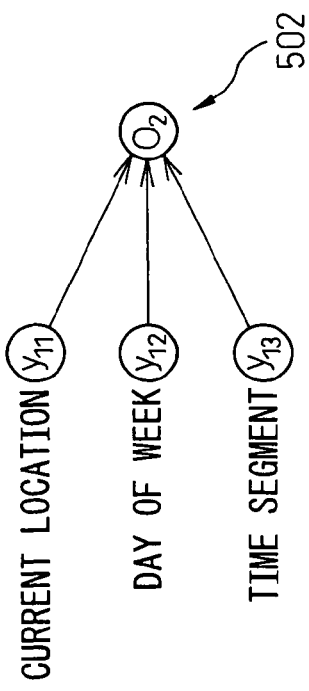

FIGS. 6A and 6B are an operation flowchart illustrating the clustering procedure.

First, as shown in FIG. 6A, the clustering subunit 662 extracts location information from the learned information $D_{Ak}$, and calculates the Euclidean distance $Ud_{ij}$ between the vehicle locations indicated by each pair of location information (step S201). In the present embodiment, the Euclidean distance $Ud_{ij}$ represents the linear distance between the vehicle locations. Next, the clustering subunit 662 checks whether or not the minimum value $Ud_{ijmin}$ of the Euclidean distance is smaller than or equal to a first distance $Td_1$ (step S202). If the minimum value $Ud_{ijmin}$ of the Euclidean distance is smaller than or equal to the first distance $Td_1$ in step S202, the clustering subunit 662 groups the pair of location information that yielded the minimum value into one cluster (step S203). Here, the first distance $Td_1$ can be set, for example, to 300 m. After that, control is returned to step S201. The clustering subunit 662 carries out step S201 once again. In this case, the clustering subunit 662 calculates the Euclidean distance between one cluster and another cluster based on a nearest neighbor method. That is, the Euclidean distance D $(C_1, C_2)$ between the two clusters $C_1$ and $C_2$ is expressed by the following equation.

$$D(C_1, C_2) = \min_{x \in C_1, y \in C_2} Ud_{xy}$$

where x and y are location information contained in the clusters $C_1$ and $C_2$, respectively, and $Ud_{xy}$ represents the Euclidean distance between x and y. Here, each location information can itself be regarded as a cluster in which the number of pieces of location information contained is 1.

On the other hand, if the minimum value $Ud_{ijmin}$ of the Euclidean distance is greater than the first distance $Td_1$ in step S202, the clustering subunit 662 selects the two largest clusters in terms of the number of pieces of location information contained in the cluster, and labels the selected clusters $C_1$ and $C_2$, respectively (step S204) Here, if there is only one cluster that contains two or more pieces of location information, the clustering subunit 662 may select only the cluster that contains the larger number of pieces of location information. In like manner, when there is no cluster that contains two or more pieces of location information, the clustering subunit 662 does not select any clusters.

Next, from among the location information not included in the clusters $C_1$ and $C_2$, the clustering subunit 662 selects the location information associated with the road segment information (step S205). Then, for each road segment information, the clustering subunit 662 obtains the number of pieces of location information associated with it, and stores the number in the storage unit 61 (step S206). After that, as shown in FIG. 6B, using Dijkstra's algorithm, the clustering subunit 662 determines the shortest route between the specific road segments indicated by the road segment information that contains the associated location information, and calculates along the shortest route the distance $Ld_{ij}$ between the specific road segments indicated by the road segment information (step S207). Here, the clustering subunit 662 may use other shortest route determining techniques than Dijkstra's algorithm when determining the shortest route between the specific road segments indicated by the road segment information. Alternatively, the clustering subunit 662 may determine the shortest route between the specific road segments indicated by the road segment information, based on the link costs calculated by considering the road width, the degree of congestion along each road segment, etc., and may use, instead of the distance $Ld_{ij}$ between the specific road segments indicated by the road segment information, the sum of the link costs obtained along the shortest route.

Next, the clustering subunit 662 checks whether or not the minimum value $Ld_{ijmin}$ of the distance between the specific road segments indicated by the road segment information is smaller than or equal to a second distance $Td_2$ (step S208). If the minimum value $Ld_{ijmin}$ is smaller than or equal to the second distance $Td_2$ in step S208, the clustering subunit 662 groups the pair of road segment information that yielded the minimum value into one cluster (step S209). Here, the second distance $Td_2$ can be set, for example, to 1.5 km. After that, the clustering subunit 662 returns control to step S207. Then, the clustering subunit 662 carries out step S207 once again. In this case, the clustering subunit 662 calculates the distance $Ld_{ij}$ between each pair of clusters along the shortest route between the specific road segments indicated by the road segment information contained in the clusters.

On the other hand, if the minimum value $Ld_{ijmin}$ of the distance between the specific road segments indicated by the road segment information is greater than the second distance $Td_2$ in step S208, the clustering subunit 662 selects from among the road segment information clusters obtained in steps S205 to S209 the two largest clusters in terms of the number of pieces of location information contained in the cluster, and labels the selected clusters $C_3$ and $C_4$, respectively (step S210). The number of pieces of location information contained in each cluster is obtained by referring to the number of pieces of location information associated with the road segment information. Then, the clustering subunit 662 groups the location information not included in any one of the clusters $C_1$ to $C_4$ into one cluster $C_5$ (step S211). Here, if there is only one cluster that contains two or more pieces of location information, the clustering subunit 662 may select only the cluster that contains the larger number of pieces of location information. In like manner, when there is no cluster that contains two or more pieces of location information, the clustering subunit 662 does not select any clusters.

The location range setting subunit 663 determines, based on the latitude and longitude, the vehicle location range corresponding to each cluster obtained in the narrow-range clustering performed in steps S201 to S204 (step S212). More specifically, the location range setting subunit 663 calculates the centroids $G_1$ and $G_2$ of the respective clusters $C_1$ and $C_2$ in terms of the latitude and longitude, and obtains the distances $r_1$ and $r_2$ from the respective centroids $G_1$ and $G_2$ to the farthest locations contained in the respective clusters $C_1$ and $C_2$. Then, the location range setting subunit 663 determines the ranges of the location information values corresponding to the respective clusters $C_1$ and $C_2$ as being the circular areas of radii $r_1$ and $r_2$ centered at the respective centroids $G_1$ and $G_2$. Alternatively, the location range setting subunit 663 may obtain the endpoints in the north, south, east, and west directions from the location information contained in the respective clusters $C_1$ and $C_2$ and may determine the vehicle location range corresponding to each cluster as being a rectangular area bounded by the lines defined by the thus obtained endpoints.

Next, the location range setting subunit 663 determines the vehicle location range corresponding to each cluster obtained in the wide-range clustering performed in steps S205 to S210 (step S213). More specifically, the location range setting subunit 663 indicates the vehicle location ranges corresponding to the respective clusters $C_3$ and $C_4$ obtained by clustering the road segment information, by the identification information of the road segment information included in the respective clusters $C_3$ and $C_4$. That is, when the identification information of the road segment information (node or link) associated with the location information matches the identification information of any one road segment information included in the cluster $C_3$ (or $C_4$), that location information is contained in the vehicle location range corresponding to the cluster $C_3$ (or $C_4$). After that, the vehicle location range corresponding to the cluster $C_5$ is set as a range not contained in any one of the clusters $C_1$ to $C_4$.

Finally, the location range setting subunit 663 stores the data defining the ranges of the location information values corresponding to the respective clusters (for example, the centroids $G_1$ and $G_2$ and radii $r_1$ and $r_2$ obtained for the respective clusters $C_1$ and $C_2$ and the identification information of the road segment information contained in the respective clusters $C_3$ and $C_4$) into the storage unit 61.

The processing performed by the clustering subunit 662 will be described below by taking as an example the case where the clustering is performed on the vehicle location information (operation points) included in the learned information related to the setting operation for setting the automotive air conditioner 1 to the inside air recirculation mode. In this example, the first distance $Td_1$ is set to 300 m, and the second distance $Td_2$ to 1.5 km.

FIG. 7A is a schematic diagram showing the distribution of operation points. In FIG. 7A, areas 701 and 702 indicate parking lots in such places as the company, park, home, or the like, and each area measures 300 meters or less in diameter. The plurality of arrows connecting between the areas 701 and 702 indicate specific road segments each represented by one link. Usually, a node corresponding to an intersection or the like is located between each pair of adjacent links, but such nodes are omitted here in order to simplify the explanation. Further, points 721 to 726 each indicate the operation point at which the occupant performed the setting operation for setting the automotive air conditioner 1 to the inside air recirculation mode. FIGS. 7B and 7C are enlarged views of the respective areas 701 and 702, and the plurality of points contained in each area indicate the operation points.

In this case, the clustering subunit 662 first performs the narrow-range clustering (step 201 to S204) by which the operation points located within the respective areas 701 and 702 are classified as belonging to the clusters $C_1$ and $C_2$, respectively. This is apparent from the fact that the diameter of each of the areas 701 and 702 is not greater than the first distance $Td_1$ and, hence, the distance between any pair of operation points in each area is less than the first distance $Td_1$.

Next, the operation points not classified as belonging to any one of the clusters by the narrow-range clustering are clustered based on their associated road segment information. Of the links connecting between the areas 701 and 702, there are shown four links 711, 712, 714, and 718 as being the links with which three operation points (721 to 723), one operation point (724), one operation point (725), and one operation point (726), respectively, are associated. Accordingly, the wide-range clustering (steps S205 to S210) is performed on these four links.

The clustering subunit 662 calculates the distance between each pair of links, for example, by summing the lengths of the links contained in the shortest route connecting between the pair of links. Accordingly, the distance between the links 711 and 712 is 0 because the links 711 and 712 are adjacent to each other. On the other hand, the distance between the links 712 and 714 is equal to the length of the link 713, and the distance between the links 714 and 718 is equal to the sum of the lengths of the links 715 to 717. Therefore, the clustering subunit 662 classifies the links 711 and 712 as belonging to the same cluster. If the length of the link 713 is less than the second distance $Td_2$ which is 1.5 km, the clustering subunit 662 classifies the link 714 as belonging to the same cluster as the links 711 and 712. However, if the length of the link 713 is greater than 1.5 km, the clustering subunit 662 classifies the link 714 as belonging to a different cluster than the cluster containing the links 711 and 712. Similarly, if the sum of the lengths of the links 715 to 717 is less than 1.5 km, the clustering subunit 662 classifies the link 718 as belonging to the same cluster as the link 714. However, if the sum of the lengths is greater than 1.5 km, the clustering subunit 662 classifies the link 718 as belonging to a different cluster than the cluster containing the link 714.

In this way, the clustering subunit 662 and the location range setting subunit 663 can set the vehicle location range so as to match the specific situation where the vehicle is traveling on a national road or where the vehicle is located in the company parking lot. In particular, in the case where the occupant performs a specific setting operation when the vehicle is traveling along a specific segment of a road, the clustering subunit 662 can differentiate that specific segment from other regions. Accordingly, even in the case where, for example, in a segment in which an expressway runs in parallel to an ordinary road, the occupant performs the specific setting operation on the automotive air conditioner 1 only when the vehicle is traveling on the expressway, the clustering subunit 662 and the location range setting subunit 663 can set the vehicle location range by differentiating between the expressway and the ordinary road.

Further, in step S205 and subsequent steps, the clustering subunit 662 may perform clustering on all the data over again. In this case, if any area contained in the narrow-range cluster $C_1$ or $C_2$ partially or completely overlaps an area contained in the wide-range cluster $C_3$ or $C_4$, the clustering subunit 662 gives preference to either one of the clusters and eliminates the overlapping area from the other cluster.

In the above embodiment, clustering has been performed in two stages, the narrow-range clustering stage and the wide-range clustering stage, but the clustering subunit 662 may perform the clustering in three or more stages, and may select in each stage one or two clusters that contain the larger number of data. Alternatively, the number of stages or the number of clusters to be formed in each stage may not be determined in advance, and when more than one half of the data have been contained in a prescribed number (for example, five) of clusters, the clustering subunit 662 may terminate the clustering and may group the remaining data into one cluster.

Further, the clustering subunit 662 may calculate the Euclidean distance by using all or some of the information contained in the location information. For example, when the location information is given in the form of three-dimensional information indicating the latitude and longitude and the heading direction of the vehicle, the clustering subunit 662 may calculate the Euclidean distance between each pair of vehicle locations by using not only the latitude and longitude but also the heading direction, rather than using only the latitude and longitude as earlier described. When the location information is clustered by also using the direction, then even when the air conditioner setting to be made is different on the same road depending on the heading direction of the vehicle, the learning unit 66 can construct a probabilistic model for automatically executing the air conditioner setting that is different depending on the heading direction. Alternatively, in the case of a narrow-range cluster, the clustering subunit 662 may perform the clustering so that only the data sampled just before the ignition key is turned off is included in the cluster, because the situation where the vehicle is parked can be distinguished from other situations by referring to the ignition key ON/OFF information. Further, if the location information includes altitude information indicating the altitude of the place where the vehicle is located, the clustering subunit 662 may cluster the location information by also using the altitude information.

Further, when other information indicating the location of the vehicle can be used, the location range setting subunit 663 may determine the range of the vehicle location by using such information. For example, when neighborhood area information or Gbook information showing the facilities (for example, convenience stores, restaurants, etc.) associated with the location information can be acquired from the navigation system in relation to the location information, the location range setting subunit 663 in the controller 60 can determine the range of the vehicle location corresponding to each cluster by using such information. More specifically, when all the data contained in the cluster represent the same facility (for example, the company parking lot), the location range setting subunit 663 can determine the range of the vehicle location corresponding to that cluster by using the information indicating the range contained in that facility, rather than using the centroid and radius as earlier described, or in addition to the centroid and radius. By adding such information to the earlier obtained vehicle location range, the location range setting subunit 663 can classify the location information more accurately.

For each of a plurality of standard models having a predetermined graph structure, the probabilistic model constructing subunit 664 constructs a tentative probabilistic model by generating CPTs for the nodes contained in each standard model based on the learned information and on the class of the vehicle location determined by the location range setting subunit 663.

To construct a versatile probabilistic model that can address various situations, a very large probabilistic model containing a large number of nodes would have to be constructed. However, the learning of such a probabilistic model would require a very long computation time, and the hardware resources required for the learning would be enormous. Accordingly, in the present embodiment, data that are likely to have a particularly close relationship to the setting operation are selected from among the state information as parameters to be input to the input nodes, and 15 kinds of standard models are generated each having a two-layer graph structure in which the probability of the setting operation being performed is obtained based on the conditional probabilities for the combination of the input parameters. However, the number of standard models is not limited to 15. The number of standard models can be optimized appropriately according to the number of kinds of state information obtained or to the kind of the setting operation to be learned. Each standard model may be constructed to take only one input parameter or to take all obtainable state information as input parameters. Further, the standard model is not limited to the two-layer graph structure, but may be constructed to have a graph structure of three or more layers, depending on the capability of the CPU constituting the controller 60.

The standard models thus generated are stored in the storage unit 61. Then, the probabilistic model constructing subunit 664 constructs a tentative probabilistic model for each standard model by determining the conditional probability between each node contained in the standard model. That is, with the tentative probabilistic model, the probability of performing the setting operation associated with the tentative probabilistic model is determined based on the class of the value of the state information used as the input parameter.

A detailed description will be given below with reference to the drawings.

FIGS. 8A to 8D show four of the 15 standard models as examples. The standard models 501 to 504 shown in FIGS. 8A to 8D are each a Bayesian network of two-layer structure comprising input nodes and an output node. The parameters given to the input nodes are different between the respective standard models 501 to 504.

From the learned information $D_{Ak}$ retrieved from the storage unit 61, the probabilistic model constructing subunit 664 counts for each node a corresponding number n for each class of the value of the state information. Then, the probabilistic model constructing subunit 664 divides the number n by the total number of events, N, to determine the value of the prior probability as well as the conditional probability. Here, if the class of the vehicle location used as the input parameter is already obtained by the clustering subunit 662 and the location range setting subunit 663, the probabilistic model constructing subunit 664 retrieves that class from the storage unit 61, i.e., the centroid and radius of each cluster or the identification information of the road segment information contained in each cluster, and classifies the state information according to that class. On the other hand, for any input parameter not yet clustered, the probabilistic model constructing subunit 664 classifies its state information according to a predetermined class. A description will be given by taking the standard model 502 of FIG. 8B as an example. Here, the learned information $D_{Ak}$ contains 30 data sets, of which the vehicle's current location information allocated to one of the input nodes is examined. It is assumed here that the current location information has been clustered by the clustering subunit 662 into five classes, i.e., the national road (near the company), the national road (near the home), the company parking lot, the fitness club parking lot, and others. In this case, the probabilistic model constructing subunit 664 examines the latitude and longitude contained in the current location information or the identification information of the road segment information associated with that location information, and determines into which cluster, i.e., into which location range, the current location information falls. If the number of times that the current location is the national road (near the company) ($y_{11}=0$) is 8, the number of times that the current location is the national road (near the home) ($y_{11}=1$) is 6, the number of times that the current location is the company parking lot ($y_{11}=2$) is 6, the number of times that the current location is the fitness club parking lot ($y_{11}=3$) is 5, and the number of times that the current location is some other place ($y_{11}=4$) is 5, then the prior probability $P(y_{11})$ for the current location information is given as $P(y_{11}=0)=0.27$, $P(y_{11}=1)=0.2$, $P(y_{11}=2)=0.2$, $P(y_{11}=3)=0.17$, and $P(y_{11}=4)=0.17$, respectively. Similarly, for the output node, the probabilistic model constructing subunit 664 counts the number of occurrences in the learned information $D_{Ak}$ for each combination of the values that the state information given to the respective input nodes or parent nodes, i.e., the current position ($y_{11}$), day of week ($Y_{12}$), and time segment ($Y_{13}$), can take, and the conditional probability is obtained by dividing that number by the total number of data, i.e., by 30. In this way, by obtaining the prior probability and the conditional probability, the probabilistic model constructing subunit 664 determines the CPT for each node.

If it is considered that the number of data used for learning is not sufficient, the probabilistic model constructing subunit 664 may estimate the probability distribution using a beta distribution and use it to construct the CPT. If some of the combinations of the input information values do no exist in the learned information $D_{Ak}$, that is, if there is unobserved data, the probabilistic model constructing subunit 664 estimates the probability distribution of the unobserved data, and calculates the corresponding conditional probability by calculating the expected value based on the estimated distribution. For the learning of such conditional probabilities, use can be made, for example, of the method described in "Introduction to Bayesian Networks" by Kazuo Shigemasu et al., 1st Edition, Baifukan, July 2006, pp. 35-38, 85-87.

In a similar manner, the probabilistic model constructing subunit 664 generates for the output node a CPT that shows the distribution of the conditional probabilities based on the information given to the respective input nodes. In the initial state, the CPT is set so that the values are equal for all the states.

The probabilistic model evaluating subunit 665 selects the tentative probabilistic model having the most appropriate graph structure by applying an information criterion to all the tentative probabilistic models constructed by the probabilistic model constructing subunit 664.

In the present embodiment, AIC (Akaike's Information Criterion) is used as the information criterion. AIC can be obtained using the following equation based on the maximum logarithmic likelihood of the probabilistic model and the number of parameters.

$$AIC_m = -2 l_m(\theta_m | X) + 2 k_m$$

Here, $AIC_m$ is the AIC for the probabilistic model M. Further, $\theta_m$ represents a set of parameters of the probabilistic model M, $l_m(\theta_m|X)$ represents the value of the maximum logarithmic likelihood of given data X in the probabilistic model M, and $k_m$ represents the number of parameters of the probabilistic model M. Here, $l_m(\theta_m|X)$ can be calculated by the following procedure. First, the probabilistic model evaluating subunit 665 obtains the frequency of occurrence from the learned data $D_{Ak}$ for each combination of parent node variables at each node. Then, the probabilistic model evaluating subunit 665 multiplies the frequency of occurrence by the logarithmic value of the conditional probability. Finally, the probabilistic model evaluating subunit 665 sums the resulting values to calculate $l_m(\theta_m|X)$. On the other hand, $k_m$ is obtained by adding together the number of combinations of the parent node variables at each node.

When AIC is obtained for all the probabilistic models, the probabilistic model evaluating subunit 665 selects the tentative probabilistic model that yielded the smallest AIC value.

For the selection of the probabilistic model (in other words, the learning of the graph structure), the probabilistic model evaluating subunit 665 may use other information criteria such as Bayes's Information Criterion (BIC), Takeuchi's Information Criterion (TIC), or Minimum Description Length (MDL). Further, the probabilistic model evaluating subunit 665 may use any of these information criteria by inverting the sign of the information criterion calculation equation. In that case, the probabilistic model evaluating subunit 665 selects the tentative probabilistic model that yielded the largest AIC value.

The probabilistic model evaluating subunit 665 stores the selected tentative probabilistic model in the storage unit 61, and adds the model as the probabilistic model to be used by the control information correcting unit 64. Then, the probabilistic model evaluating subunit 665 acquires the ID of the occupant and the setting operation number k associated with the learned information $D_{Ak}$, and stores them in the storage unit 61 by associating them with the added probabilistic model. Further, the probabilistic model evaluating subunit 665 identifies, based on the setting operation number k, the setting parameter to be corrected based on the probabilistic model and the correction value to be used, and stores them in the storage unit 61 by associating them with the probabilistic model. The correspondence between the setting operation number k, the setting parameter to be corrected, and the correction value to be used is predefined in the form of a lookup table and held in the storage unit 61.

The air conditioning operation of the automotive air conditioner 1 according to the present invention will be described below with reference to the flowcharts shown in FIGS. 9A, 9B, and 10. The air conditioning operation is performed by the controller 60 in accordance with a computer program incorporated in the controller 60.

Figure 9A:
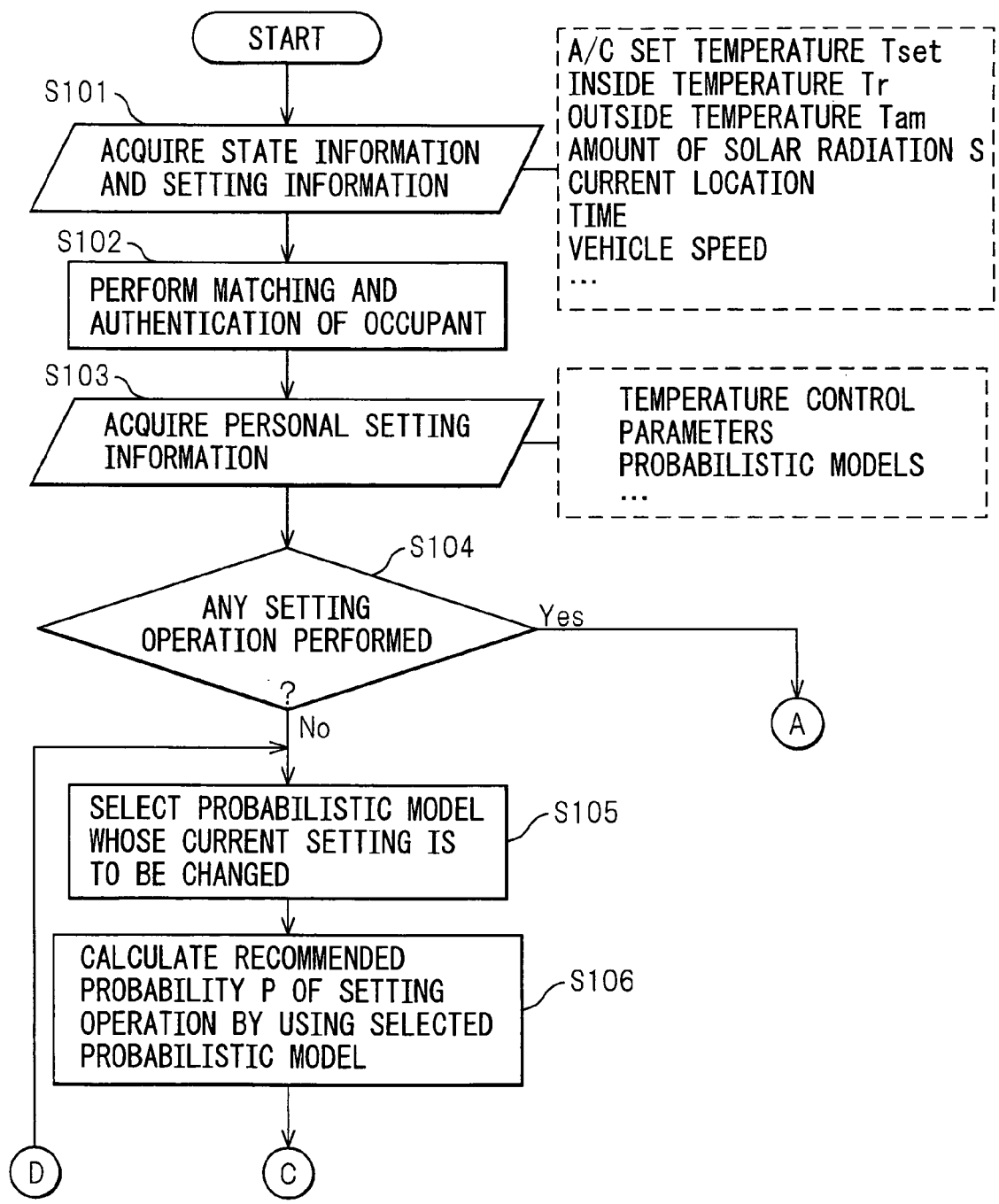
FIGS. 9A and 9B are flowcharts showing the control operation of the automotive air conditioner according to the present invention.

First, as shown in FIG. 9A, when the engine switch is turned on, the controller 60 starts the automotive air conditioner 1. Then, the controller 60 acquires various kinds of state information from the sensors, the navigation system 56, the vehicle operation apparatus 57, etc. via the communication unit 62 (step S101). The various kinds of state information thereafter are acquired at periodic intervals of time (for example, every five seconds). The controller 60 also acquires various kinds of setting information from the storage unit 61. Next, the matching unit 63 in the controller 60 performs the matching and authentication of the occupant (step S102). Then, the controller 60 retrieves from the storage unit 61 the personal setting information of the registered user identified as matching the occupant (step S103).

Next, the controller 60 determines whether or not the occupant has performed any setting operation on the automotive air conditioner 1 (step S104). Here, when an operation signal is received from the A/C operation panel 59, the controller 60 determines that a setting operation has been performed. If the occupant has not performed any setting operation, the control information correcting unit 64 in the controller 60 selects a probabilistic model whose current setting is to be changed, from among the probabilistic models $M_{Aqk}$ associated with that occupant for the correction of the setting parameter (for example, the set temperature $T_{set}$) related to any one of the operation groups (step S105). The probabilistic model $M_{Aqk}$ represents the q-th probabilistic model constructed for the setting operation identified by the setting operation number k and performed by the occupant A. Next, the control information correcting unit 64 inputs the observed state information into the selected probabilistic model. The control information correcting unit 64 then calculates the probability that the setting operation associated with the probabilistic model is performed (step S106). Then, from among the probabilities calculated for the setting operation in the same operation group associated with that setting parameter, the control information correcting unit 64 selects the highest probability as the recommended probability P.

Figure 9B:
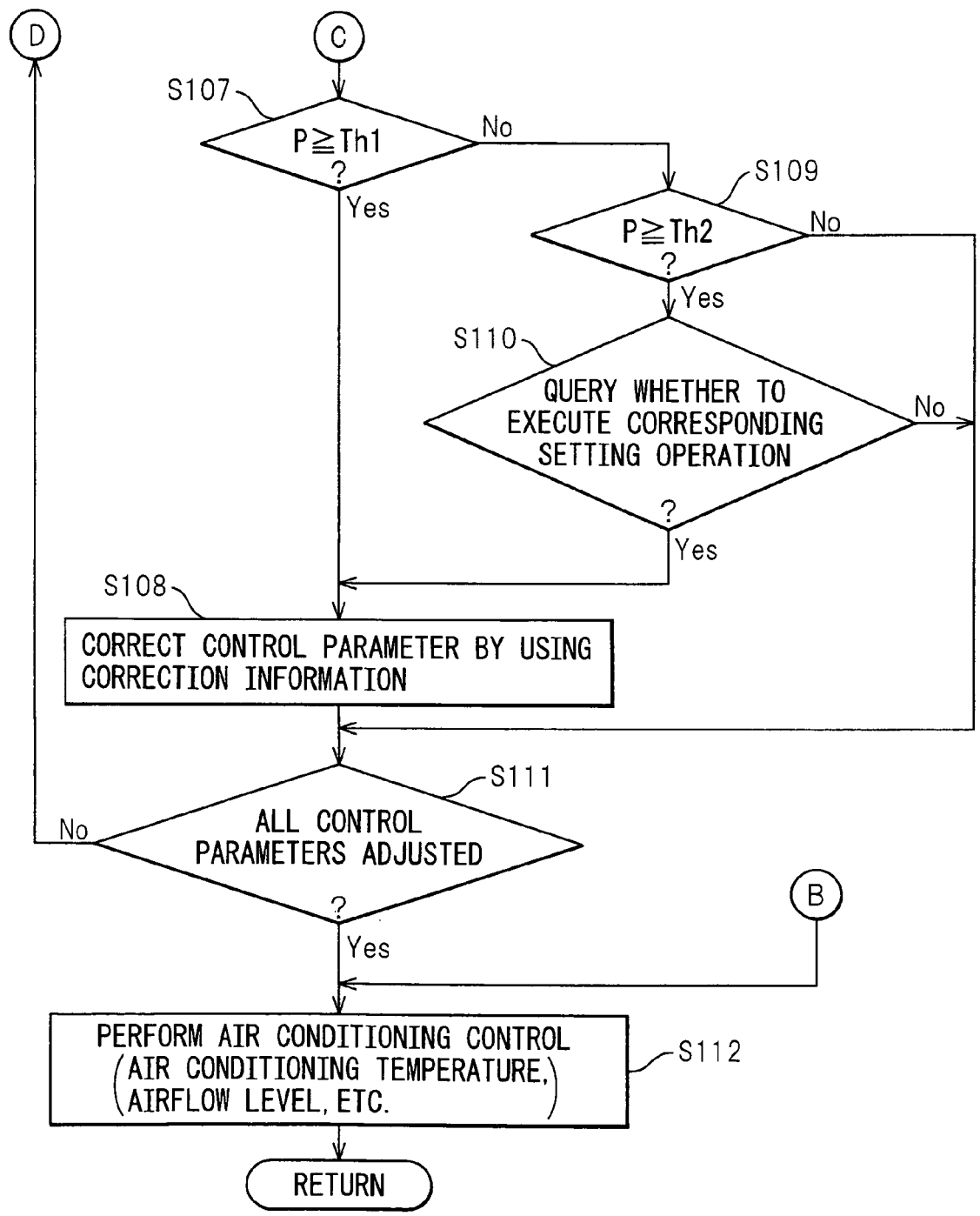

Next, as shown in FIG. 9B, the control information correcting unit 64 compares the recommended probability P with a first predetermined value Th1 (step S107). If the recommended probability P is greater than or equal to the first predetermined value Th1 (for example, 0.9), the control information correcting unit 64 corrects the corresponding setting parameter of the automotive air conditioner 1 based on the correction information associated with the probabilistic model that yielded the recommended probability P (hereinafter called the selected probabilistic model) (step S108). On the other hand, if the recommended probability P is smaller than the first predetermined value Th1, the control information correcting unit 64 compares the recommended probability P with a second predetermined value Th2 (for example, 0.6) (step S109). If the recommended probability P is greater than or equal to the second predetermined value Th2, the control information correcting unit 64 displays on the display section of the A/C operation panel 59 or the like the setting operation corresponding to the setting operation number k associated with the selected probabilistic model, and thus queries the occupant whether the setting operation should be executed or not (step S110). When the occupant approves the execution of the setting operation, the control information correcting unit 64 corrects the setting parameter based on the correction information associated with the selected probabilistic model (step S108). On the other hand, when the occupant does not approve, the control information correcting unit 64 does not correct the setting parameter. In other words, the controller 60 does not execute the setting operation related to the setting parameter associated with the selected probabilistic model. Likewise, if the recommended probability P is smaller than the second predetermined value Th2 in step S109, the control information correcting unit 64 does not correct the setting parameter.

After that, the control information correcting unit 64 determines whether all the setting parameters have been adjusted or not, by checking whether the probability has been calculated for all the probabilistic models (step S111). If there is any probabilistic model for which the probability is not calculated yet, that is, if there is any operation group that is not yet checked as to whether the setting information is to be corrected or not, the controller 60 returns control to step S105. On the other hand, if the probability has been calculated for all the probabilistic models, then the air-conditioning control unit 65 in the controller, based on the setting parameters corrected as needed, adjusts the opening of the air mix door, the number of revolutions of the blower fan, and the opening of each air outlet door so as to achieve the desired air conditioning temperature, airflow level, etc. (step S112).

Figure 10:
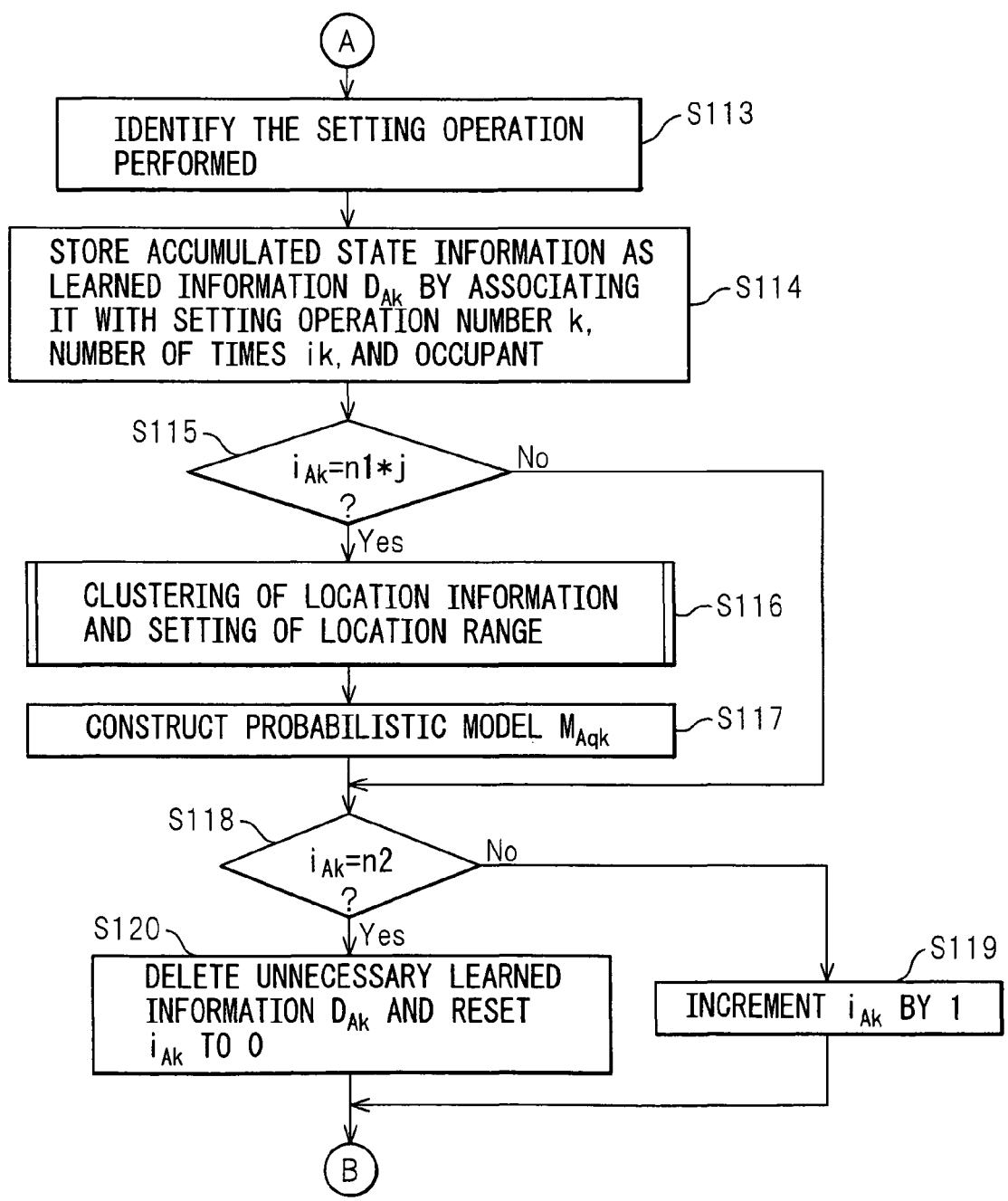
FIG. 10 is a flowchart showing the control operation of the automotive air conditioner according to the present invention.

As shown in FIG. 10, when it is determined in step S104 that the occupant has performed a setting operation on the automotive air conditioner 1, the controller 60 identifies which setting operation has been performed by referring to the setting signal (step S113). Then, the learning unit 66 in the controller 60 stores the state information acquired during a predetermined period of time before and after the setting operation (for example, for 10 seconds before and after the setting operation) into the storage unit 61 as an element of the learned information $D_{Ak}$ by associating it with the setting operation number k corresponding to that setting operation and the number of times, $i_{Ak}$, that the setting operation has been performed (step S114).

Subsequently, the learning unit 66 determines whether the number of times of the operation, $i_{Ak}$, is equal to a predetermined number of times n1*j (j=1, 2, 3) (step S115). The predetermined number of times n1 is, for example, 10. If it is determined that $i_{Ak}$=n1*j, the clustering subunit 662 in the learning unit 66 performs clustering on the location information from among the learned information $D_{Ak}$ stored in the storage unit 61 by being associated with the occupant and the setting operation number k (step S116). Then, the location range setting subunit 663 determines the vehicle location range corresponding to each cluster obtained by the clustering. Here, the clustering of the learned information is performed in accordance with the procedure shown in the flowchart of FIG. 6.

After that, the learning unit 66 constructs the probabilistic model $M_{Aqk}$ for that setting operation by using the learned information $D_{Ak}$ (step S117). More specifically, the probabilistic model constructing subunit 664 in the learning unit 66 constructs a tentative probabilistic model by generating CPTs for each standard model, as earlier described. Then, the probabilistic model evaluating subunit 665 in the learning unit 66 calculates the information criterion for each tentative probabilistic model, and the tentative probabilistic model that yielded the smallest information criterion value is selected as the probabilistic model $M_{Aqk}$ to be used. The learning unit 66 then stores the probabilistic model $M_{Aqk}$ in the storage unit 61 by associating it with the occupant's ID, etc. On the other hand, if $i_{Ak}$ is not equal to n1*j in step S115, the learning unit 66 transfers control to step S118.

Next, the learning unit 66 determines whether the number of times of the operation, $i_{Ak}$, is equal to a predetermined number of times n2 (for example, n2=30) (step 118). If $i_{Ak}$ is not equal to n2, the learning unit 66 increments $i_{Ak}$ by 1 (step S119), and transfers control to step S112 shown. On the other hand, if $i_{Ak}$=n2 in step S118, the learning unit 66 deletes the learned information $D_{Ak}$ stored in the storage unit 61 by being associated with the occupant and the setting operation number k (step S120).

Further, it is determined that the probabilistic model $M_{Aqk}$ currently stored in the storage unit 61 is an established one, and thereafter, no updating is performed on the probabilistic model $M_{Aqk}$. The learning unit 66 appends flag information to the established probabilistic model $M_{Aqk}$ to indicate that the probabilistic model is not to be updated. For example, the learning unit 66 stores an update flag f in the storage unit 61 by associating it with the probabilistic model. The learning unit 66 can determine whether updating is allowed or not by checking the state of the flag; that is, if it is set to 1', updating (rewriting) is prohibited, and if it is set to 0', updating is allowed. The learning unit 66 initializes $i_{Ak}$ to 0. After that, the learning unit 66 transfers control to step S112.

The predetermined number of times n2 is larger than n1, and corresponds to the number of data considered sufficient to construct a statistically accurate probabilistic model. The predetermined numbers n1 and n2 can be optimized experimentally and empirically.

In step S115 in the above flowchart, the learning unit 66 may determine whether to construct or not to construct the probabilistic model by checking whether a first predetermined time (for example, one week or one month) has elapsed since the last time the probabilistic model associated with the same setting operation was constructed, rather than by comparing the number of times of the operation, $i_{Ak}$, with the prescribed number of times n1*j (j=1, 2, 3). In that case, the learning unit 66 constructs the probabilistic model when the predetermine time has elapsed. In other words, the learning unit 66 proceeds to carry out the process from step S116 to S120. To determine whether to construct or not to construct the probabilistic model based on the elapsed time, the controller 60 stores the time and date of construction of the probabilistic model in advance into the storage unit 61 by associating it with the probabilistic model. When calculating the elapsed time, the learning unit 66 acquires from the storage unit 61 the time and date of construction associated with the most recent probabilistic model among the probabilistic models related to the setting operation α, and calculates the elapsed time by obtaining the difference between the acquired time and the current time.

Further, when the learning unit 66 determines whether to construct or not to construct the probabilistic model based on the elapsed time, in step S118 the learning unit 66 may compare the elapsed time with a second predetermined time (for example, four weeks or six months) longer than the first predetermined time. Then, when the elapsed time is longer than the second predetermined time, the learning unit 66 deletes the learned information $D_{Ak}$ and updates the update flag f.

After that, the automotive air conditioner 1 repeats the control process from steps S101 to S120 until its operation is stopped.

As described above, in generating the probabilistic model, the automotive air conditioner according to the present invention determines the range of the vehicle location based on the road segment when the occupant performed a specific setting operation, and constructs, based on the result, the probabilistic model for calculating the probability; accordingly, even when the specific setting operation is performed in a specific segment of a road, the optimum air conditioner setting can be automatically accomplished.

The present invention is not limited to the above specific embodiment. For example, in the above embodiment, the clustering subunit 662 has been described as performing clustering on the road segment information in the wide-range clustering only, but it may be configured to perform clustering on the road segment information in the narrow-range clustering also. Further, the clustering subunit 662 may perform clustering on the road segment information by using other hierarchical clustering techniques, such as a furthest neighbor method, a group average method, or Ward's method, rather than the nearest neighbor method described above. Alternatively, the clustering subunit 662 may perform clustering on the road segment information by using non-hierarchical clustering techniques such a k-means method. Further, in the above embodiment, the location information acquiring unit, the road information acquiring unit, and the segment determining unit have been described as being incorporated in the navigation system, but these units may be provided separately from the navigation system.

The learning unit 66 may also perform clustering on information who value varies continuously, such as time information, and may determine the range of its value.

Further, the vehicle occupant is not limited to the vehicle driver. If provisions are made to identify who has performed a setting operation on the automotive air conditioner, the present invention can be advantageously applied to the case where any occupant other than the driver operates the air conditioner. For example, when the automotive air conditioner has two A/C operation panels 59 one for the driver and the other for the passenger, the controller 60 may determine which occupant, the driver or the passenger, has operated the air conditioner, by checking which A/C operation panel 59 has been operated. Alternatively, as described in Japanese Unexamined Patent Publication No. 2002-29239, an operating occupant detection sensor such as an infrared temperature sensor may be provided on the A/C operation panel 59 so that the controller 60 can determine which occupant, the driver or the passenger, has operated the air conditioner.

When the passenger has operated the air conditioner, the controller 60 performs the matching and authentication of the passenger based on the image data captured by the in-car camera 54, in the same manner as when performing the matching and authentication of the driver, and the controller 60 stores the state information such as various sensor values at the time of the operation by associating it with that passenger, not with the driver.

Further, when the occupant is limited to a specific person, or when constructing a probabilistic model only for the kind of setting operation that is expected to be performed by anyone who drives the vehicle, the matching unit 63 may be omitted. In this case, the same probabilistic model and the same learned information for the learning of the probabilistic model are used regardless of who the operating occupant is.

Further, the state information to be used for the construction of the probabilistic model and for the setting operation using the probabilistic model may include information concerning the setting of the automotive air conditioner (such as the set temperature, airflow level, etc.) when the state information was acquired.

In the above embodiment, the parameters to be corrected by the control information correcting unit 64 have been described as being the parameters relating to the setting information such as the temperature setting, airflow level setting, etc. that the occupant can directly set from the A/C operation panel 59. However, the control information correcting unit 64 may be configured to correct, using the probabilistic model, the parameters relating to the control information used to control the various parts of the air-conditioning unit 10, such as the air conditioning temperature $T_{ao}$ calculated using the temperature control equation, the number of revolutions of the blower fan 21 calculated using the airflow level control equation, the opening of the air mix door 28, etc.

In the above embodiment, standard models having a predetermined graph structure have been generated in advance for the construction of probabilistic models; however, instead of generating such standard models, the learning unit 66 may search a graph structure by using a K2 algorithm or a genetic algorithm. For example, when using a genetic algorithm, a plurality of genes are generated each serving as an element indicating the presence or absence of a connection between nodes. Then, the learning unit 66 calculates the fitness of each gene by using the previously described information criterion. After that, the learning unit 66 selects genes having fitness values greater than a predetermined value, and performs such manipulations as crossover and mutation to produce the next generation of genes. The learning unit 66 repeats such manipulations a plurality of times and selects genes having the best fitness. The learning unit 66 uses the graph structure described by the selected genes to construct the probabilistic model. The learning unit 66 may combine any of these algorithms with the method of constructing the probabilistic model from a standard model.

In the above embodiment, a Bayesian network has been used as the probabilistic model, but other probabilistic models such as a hidden Markov model may be used instead.

The present invention can be applied to an air conditioner of any type, whether it be a front single type, a left/right independent type, a rear independent type, a four-seat independent type, or an upper/lower independent type. When applying the present invention to an air conditioner of an independent type, a plurality of inside temperature sensors and solar sensors may be mounted.

The present invention can be applied to other apparatus than air conditioning apparatus. The present invention can also be applied to a control apparatus that acquires a plurality of kinds of state information, inputs the state information into a probabilistic model associated with a specific control operation, obtains the recommended probability of the specific control operation being performed, and performs the specific control operation when the recommended probability is greater than a predetermined value. For example, the present invention can be applied to a car audio control apparatus. FIG. 11 shows a functional block diagram of a car audio control apparatus 600 to which the present invention is applied. In FIG. 11, the control apparatus 600 differs from the controller 60 of the automotive air conditioner 1 shown in FIG. 2 by the inclusion of an audio control unit 650 instead of the air-conditioning control unit 65. The other units in the control apparatus 600 are identical in function to the corresponding units in the controller 60 of the automotive air conditioner 1 shown in FIG. 2.

Suppose here that each time the vehicle approaches a point where an AM radio broadcast for traffic information can be received, the occupant performs an operation to tune the radio to the AM broadcast. In this case, the control apparatus 600 acquires from the navigation system (not shown), via the communication unit 62, the location information indicating the operation point where the occupant has performed the tuning operation and the road segment information with which the location information is associated, and stores them as learned information into the storage unit 61. Further, the control apparatus 600 acquires from the car audio operation unit (not shown) a signal indicating the kind of the setting operation that the occupant has performed. The control apparatus 600 may also acquire other information such as time information via the communication unit 62. Then, the learning unit 66 in the control apparatus 600, in accordance with the present invention, constructs a probabilistic model for automatically executing the tuning operation. For this purpose, the clustering subunit 662 performs clustering on the operation points accumulated as the learned information, that is, the narrow-range clustering based on the distance between each operation point or the wide-range clustering based on the specific road segments with which the operation points are associated, as earlier described. Then, the location range setting subunit 663 determines the range of the point where the tuning operation is to be performed, by determining the range of the value of the operation point corresponding to each cluster based on the coordinate value of the operation point or on the identification information of the specific road segment with which the operation point is associated. Then, based on the vehicle location information, the probabilistic model constructing subunit 664 generates the probabilistic model for calculating the probability of tuning the radio to the AM broadcast. By inputting the periodically acquired location information into the thus generated probabilistic model, the control information correcting unit 64 obtains the probability of the tuning operation being performed. Then, when the probability exceeds a predetermined threshold value, the control information correcting unit 64 corrects the car audio setting information so as to achieve the setting operation for tuning the radio to the traffic information broadcasting AM station. The audio control unit 650 tunes the radio to the AM station in accordance with the thus corrected setting information. In this way, the car audio control apparatus automatically tunes to the AM broadcast station when the vehicle approaches a point where the traffic information AM broadcast can be received.

The present invention can also be used for control apparatus for controlling various parts of the vehicle, for example, the power windows, key locks, headlights, hazard lamps, door mirrors, fuel lid, sunroof, wipers, adaptive cruise control (ACC), adaptive variable suspensions (AVS), gear shifting, etc. The invention can also be applied to vehicle driving control systems, such as brake control, throttle opening control, steering control, etc. When applying the invention to such apparatus, the air-conditioning control unit 65 in the controller 60 shown in FIG. 2 should be changed to the control unit that matches the apparatus to be controlled, as in the case of the car audio control apparatus.

Furthermore, the present invention can be applied to a portable telephone; in this case, if the user always performs a specific operation as the user approaches a specific place, the portable telephone can be made to automatically perform the specific operation when the user arrives at the specific place.

As described above, those skilled in the art can make various modifications within the scope of the present invention.

What is claimed is:

1. A location range setting apparatus comprising:
   a location information acquiring unit for acquiring location information indicating a location of a mobile object;
   a road information acquiring unit for acquiring road segment information indicating a specific segment of a road;
   a segment determining unit for associating said location information with said road segment information corresponding to the location indicated by said location information;
   a storage unit for storing a plurality of pieces of said location information and said road segment information respectively as learned data;
   a clustering unit for clustering said plurality of pieces of road segment information included in said learned data into at least a first cluster or a second cluster; and
   a location range setting unit for determining a first range for the location of said mobile object from the road segment information included in said first cluster, and for determining a second range for the location of said mobile object from the road segment information included in said second cluster.

2. The location range setting apparatus according to claim 1, wherein said location range setting unit indicates said first range by identification information identifying the road segment information included in said first cluster.

3. The location range setting apparatus according to claim 1, wherein said clustering unit clusters, from among said plurality of pieces of location information included in said learned data, the location information whose distance relative to each other is not greater than a predetermined value into at least one third cluster, and clusters the road segment information with which the location information not included in said at least one third cluster is associated into said first cluster or said second cluster.

4. A controller for an apparatus mounted in a mobile object, comprising:

a location information acquiring unit for acquiring location information indicating a location of said mobile object;
a road information acquiring unit for acquiring road segment information indicating a specific segment of a road;
a segment determining unit for associating said location information with said road segment information corresponding to the location indicated by said location information;
a storage unit for storing a plurality of pieces of said location information and said road segment information respectively as learned data;
a learning unit for constructing, by using said learned data, a probabilistic model into which said location information is inputted in order to calculate a recommended probability of a specific setting operation;
a control information correcting unit for calculating said recommended probability by inputting current location information, which indicates the current location of said mobile object, into the probabilistic model constructed by said learning unit, and for correcting setting information or control information related to a user setting operation in accordance with said recommended probability so as to achieve said specific setting operation; and
a control unit for controlling said apparatus in accordance with said corrected setting information or control information, wherein
said learning unit comprises:
a clustering subunit for clustering said plurality of pieces of road segment information included in said learned data into at least a first cluster or a second cluster;
a location range setting subunit for determining a first range for the location of said mobile object from the road segment information included in said first cluster, and for determining a second range for the location of said mobile object from the road segment information included in said second cluster; and
a probabilistic model constructing subunit for constructing said probabilistic model by determining said recommended probability for the mobile object location contained in said first range and said recommended probability for the mobile object location contained in said second range.

5. The controller according to claim 4, wherein said location range setting subunit indicates said first range by identification information identifying the road segment information included in said first cluster.

6. The controller according to claim 4, wherein said clustering subunit clusters, from among said plurality of pieces of location information included in said learned data, the location information whose distance relative to each other is not greater than a predetermined value into at least one third cluster, and clusters the road segment information with which the location information not included in said at least one third cluster is associated into said first cluster or said second cluster.

7. An automotive air conditioner comprising:
an air-conditioning unit for supplying conditioned air into a vehicle;
a location information acquiring unit for acquiring location information indicating a location of said vehicle;
a road information acquiring unit for acquiring road segment information indicating a specific segment of a road;

a segment determining unit for associating said location information with said road segment information corresponding to the location indicated by said location information;

a storage unit for storing a plurality of pieces of said location information and said road segment information respectively as learned data;

a learning unit for constructing, by using said learned data, a probabilistic model into which said location information is inputted in order to calculate a recommended probability of a vehicle occupant performing a specific setting operation;

a control information correcting unit for calculating said recommended probability by inputting current location information, which indicates the current location of said vehicle, into the probabilistic model constructed by said learning unit, and for correcting setting information or control information related to a setting operation of said occupant in accordance with said recommended probability so as to achieve said specific setting operation; and an air-conditioning control unit for controlling said air-conditioning unit in accordance with said corrected setting information or control information, wherein said learning unit comprises:

a clustering subunit for clustering said plurality of pieces of road segment information included in said learned data into at least a first cluster or a second cluster;

a location range setting subunit for determining a first range for the location of said vehicle from the road segment information included in said first cluster, and for determining a second range for the location of said vehicle from the road segment information included in said second cluster; and a probabilistic model constructing subunit for constructing said probabilistic model by determining said recommended probability for the vehicle location contained in said first range and said recommended probability for the vehicle location contained in said second range.

8. The automotive air conditioner according to claim 7, wherein said location range setting subunit indicates said first range by identification information identifying the road segment information included in said first cluster.

9. The automotive air conditioner according to claim 7, wherein said clustering subunit clusters, from among said plurality of pieces of location information included in said learned data, the location information whose distance relative to each other is not greater than a predetermined value into at least one third cluster, and clusters the road segment information with which the location information not included in said at least one third cluster is associated into said first cluster or said second cluster.

10. A control method for a controller for controlling an apparatus mounted in a mobile object, said controller having a storage unit, a control information correcting unit, having at least one probabilistic model associated with a specific setting operation, for calculating a recommended probability of a user performing said specific setting operation by inputting location information indicating a location of said mobile object into said probabilistic model, and for correcting setting information or control information related to a setting operation of said user in accordance with said recommended probability so as to achieve said specific setting operation, and a control unit for controlling said apparatus in accordance with said corrected setting information or control information, said control method comprising:

acquiring said location information;

acquiring road segment information indicating a specific segment of a road;

associating said location information with said road segment information corresponding to the location indicated by said location information;

storing a plurality of pieces of said location information and said road segment information respectively as learned data into said storage unit;

clustering said plurality of pieces of road segment information included in said learned data stored in said storage unit into at least a first cluster or a second cluster;

determining a first range for the location of said mobile object from the road segment information included in said first cluster, and determining a second range for the location of said mobile object from the road segment information included in said second cluster; and constructing said probabilistic model by determining said recommended probability for the mobile object location contained in said first range and said recommended probability for the mobile object location contained in said second range.

11. The control method according to claim 10, wherein said determining said first range indicates said first range by identification information identifying the road segment information included in said first cluster.

12. The control method according to claim 10, further comprising clustering, from among said plurality of pieces of location information included in said learned data, the location information whose distance relative to each other is not greater than a predetermined value into at least one third cluster, and wherein said clustering said plurality of pieces of road segment information into at least said first cluster or said second cluster, clusters the road segment information with which the location information not included in said at least one third cluster is associated into said first cluster or said second cluster.

13. A control method for an automotive air conditioner having an air-conditioning unit for supplying conditioned air into a vehicle, a storage unit, a control information correcting unit, having at least one probabilistic model associated with a specific setting operation, for calculating a recommended probability of a vehicle' occupant performing said specific setting operation by inputting location information indicating a location of said vehicle into said probabilistic model, and for correcting setting information or control information related to a setting operation of said occupant in accordance with said recommended probability so as to achieve said specific setting operation, and an air-conditioning control unit for controlling said air-conditioning unit in accordance with said corrected setting information or control information, said control method comprising:

acquiring said location information;

acquiring road segment information indicating a specific segment of a road;

associating said location information with said road segment information corresponding to the location indicated by said location information;

storing a plurality of pieces of said location information and said road segment information respectively as learned data into said storage unit;

clustering said plurality of pieces of road segment information included in said learned data stored in said storage unit into at least a first cluster or a second cluster;

determining a first range for the location of said vehicle from the road segment information included in said first cluster, and determining a second range for the location of said vehicle from the road segment information included in said second cluster; and constructing said probabilistic model by determining said recommended probability for the vehicle location contained in said first range and said recommended probability for the vehicle location contained in said second range.

14. The control method according to claim 13, wherein said determining said first range indicates said first range by identification information identifying the road segment information included in said first cluster.

15. The control method according to claim 13, further comprising clustering, from among said plurality of pieces of location information included in said learned data, the location information whose distance relative to each other is not greater than a predetermined value into at least one third cluster, and wherein said clustering said plurality of pieces of road segment information into at least said first cluster or said second cluster, clusters the road segment information with which the location information not included in said at least one third cluster is associated into said first cluster or said second cluster.

\* \* \* \* \*